(12) United States Patent
Amthor et al.

(10) Patent No.: US 12,694,568 B2
(45) Date of Patent: Jul. 28, 2026

(54) METHOD FOR IDENTIFYING ANALYTES IN AN IMAGE SERIES

(71) Applicant: Carl Zeiss Microscopy GmbH, Jena (DE)

(72) Inventors: Manuel Amthor, Jena (DE); Daniel Haase, Zoellnitz (DE)

(73) Assignee: Carls Zeiss Microscopy GmbH, Jena (DE)

( * ) Notice: Subject to any disclaimer, the term of this patent is extended or adjusted under 35 U.S.C. 154(b) by 323 days.

(21) Appl. No.: 18/519,272

(22) Filed: Nov. 27, 2023

(65) Prior Publication Data

US 2024/0177351 A1 May 30, 2024

(30) Foreign Application Priority Data

Nov. 28, 2022 (DE) ..................... 10 2022 131 444.8

(51) Int. Cl.
*G06T 7/90* (2017.01)
*G06V 10/762* (2022.01)

(52) U.S. Cl.
CPC .............. *G06T 7/90* (2017.01); *G06V 10/762* (2022.01); *G06T 2207/10024* (2013.01);
(Continued)

(58) Field of Classification Search
CPC ............. G06T 7/90; G06T 2207/10024; G06T 2207/20081; G06T 2207/30024;
(Continued)

(56) References Cited

U.S. PATENT DOCUMENTS

| | | | |
|---|---|---|---|
| 11,169,368 B2 | 11/2021 | Marsh et al. | |
| 2013/0005596 A1* | 1/2013 | Gong ..................... | A61P 25/04 |
| | | | 435/6.12 |

(Continued)

FOREIGN PATENT DOCUMENTS

| | | |
|---|---|---|
| CN | 1307263 C | 3/2007 |
| CN | 103559724 A | 2/2014 |

(Continued)

OTHER PUBLICATIONS

Research Report issued in the DE Patent Application No. 10 2022 131 444.8, mailed on Oct. 25, 2023. 5 pages.

*Primary Examiner* — Ali Bayat
(74) *Attorney, Agent, or Firm* — HoustonHogle LLP

(57) ABSTRACT

A method for identifying analytes in an image series, the image series being generated by marking the analytes with markers in multiple coloring rounds and detecting the markers using a camera. The markers are selected in such a way that image signals of an analyte in an image area over the image series include colored signals and uncolored signals. The method comprises extracting multiple signal series of an image area of the image series in each case and filtering out candidate signal series from the extracted signal series. A ratio of at least one of the colored and/or uncolored signals of a candidate signal series to at least one other of the colored and/or uncolored signals of the particular signal series is a characteristic ratio, and/or a candidate signal series has a characteristic signature that has at least one characteristic ratio.

28 Claims, 6 Drawing Sheets

(52) U.S. Cl.
CPC .............. *G06T 2207/20081* (2013.01); *G06T 2207/30024* (2013.01); *G06T 2207/30204* (2013.01)

(58) Field of Classification Search
CPC ......... G06T 2207/30204; G06T 7/0002; G06T 7/30; G06T 2207/10016; G06T 2207/10061; G06V 10/762; G06V 20/69; G06V 20/698; G06V 10/763; G01N 21/84
USPC ......................................................... 382/128
See application file for complete search history.

(56)                    References Cited

U.S. PATENT DOCUMENTS

| | | | |
|---|---|---|---|
| 2014/0118524 | A1 | 5/2014 | Munck |
| 2019/0025310 | A1* | 1/2019 | Duval .............. G01N 33/57419 |
| 2020/0033267 | A1 | 1/2020 | Klaiman |
| 2021/0147922 | A1 | 5/2021 | Urnov et al. |
| 2021/0208076 | A1 | 7/2021 | Chang et al. |
| 2021/0388434 | A1* | 12/2021 | Pradhan ............... C12Q 1/6841 |
| 2022/0162684 | A1* | 5/2022 | Aksel ................... C12Q 1/6876 |
| 2024/0376530 | A1* | 11/2024 | Wang ................. G01N 33/6854 |
| 2025/0179564 | A1* | 6/2025 | Raj ....................... C12Q 1/6841 |
| 2025/0189531 | A1* | 6/2025 | Wells .................... G01N 30/88 |

FOREIGN PATENT DOCUMENTS

| | | |
|---|---|---|
| CN | 107845085 B | 3/2018 |
| DE | 10063112 A1 | 6/2002 |
| DE | 69719966 T2 | 12/2003 |
| DE | 102005022880 B4 | 12/2010 |
| DE | 102018133188 A1 | 6/2020 |
| EP | 2992115 B1 | 3/2020 |
| JP | 2012122852 A | 6/2012 |
| WO | WO 2003098313 A2 | 11/2003 |
| WO | WO 2011112634 A2 | 9/2011 |
| WO | WO 2017216270 A1 | 12/2017 |
| WO | WO 2019115801 A1 | 6/2019 |
| WO | WO 2020254519 A1 | 12/2020 |
| WO | WO 2021234698 A1 | 11/2021 |
| WO | WO 2021255244 A1 | 12/2021 |

* cited by examiner

METHOD FOR IDENTIFYING ANALYTES IN AN IMAGE SERIES

RELATED APPLICATIONS

This application claims priority to German Patent Application No. 10 2022 131 444.8, filed on Nov. 28, 2022, which is incorporated herein by reference in its entirety.

The present invention relates to a method for identifying analytes in an image series, a method for training a machine learning system, using a candidate extraction model for extracting candidate areas in an image series, a method for training a machine learning system, using a model registration model for determining registration information from images of an image series, a method for identifying analytes in an image series, and a method for determining registration information from images of an image series by use of a registration model.

EP 2 992 115 B1 provides a method for identifying analytes by coloring the analytes to be identified, using markers in multiple coloring rounds. The markers are made up of oligonucleotides and dyes coupled thereto, which are generally fluorescent dyes. The oligonucleotides are specific for certain segments of the analytes that are to be identified. However, the individual oligonucleotides of the markers are not unique for the particular analytes. Due to the multiple coloring rounds, however, it is possible to carry out an unambiguous determination of the analytes, since multiple different markers may be assigned to a certain oligonucleotide after carrying out the multiple coloring rounds, and the assigned multiple markers are then unambiguous for the particular analytes.

By use of this method, many different analytes may be detected in vitro, for example in a cell, by means of a fluorescence microscope. The analytes may be RNA, in particular mRNA or tRNA. The analytes may also be a DNA segment.

A plurality of analytes is often present in a sample, and may be identified in parallel using the coloring rounds explained above, even if different analytes are involved. The more analytes present in the sample, the larger is the number of markers to be detected in the particular coloring rounds. With automatic detection and evaluation of the image signals in question, the image signals of all markers in the sample must be detected, and must also be distinguished from image signals in the sample that are not caused by markers coupled to analytes.

WO 2020/254519 A1 and WO 2021/255244 A1 provide a further method via which analytes, among other things, as well as proteins may be identified. In this method, probes that are specific for the particular analytes are initially coupled to the analytes. The probes have oligonucleotide residues that do no hybridize with the analytes. Decoding oligonucleotides having a supernatant for the free residues are hybridized at the free oligonucleotide residues. Marker molecules, markers for short, are hybridized using a dye at the supernatants. In this method as well, a series of image signals at the analytes in question is generated in multiple coloring rounds, which allows the particular analyte present to be deduced. However, methods are also known in which the markers bind directly to the free oligonucleotide residues.

In practice, it has been shown that the data volume for describing the image signals of the multiple coloring rounds may be several terabytes. Processing such large data volumes requires a correspondingly large memory. The resulting acquisition and maintenance costs are correspondingly high. Preferred as data memory are SSD hard drives, which on the one hand are suitable for storing such large data volumes, and which on the other hand allow rapid access to the data. However, SSD hard drives allow only a limited number of write cycles. With such large data volumes this limit is quickly reached, which may result in failure of the system. Furthermore, the analysis of such large data volumes requires a correspondingly high level of computing power, or the analysis takes longer, and a user must wait for a correspondingly long time for a result of his/her experiment.

SUMMARY OF THE INVENTION

The object of the invention is to provide an improved method for identifying analytes in an image series, via which analytes having an image signal that is only slightly above a noise level may also be reliably recognized.

A further object of the invention is to provide a method that allows a machine learning system to be trained using a candidate extraction model for identifying candidate signal series in an image series.

A further object of the invention is to provide a method that allows images of an image series to be registered with one another in the best way possible.

A further object of the invention is to provide a method for identifying a type of analyte.

One aspect of the invention relates to a method for identifying analytes in an image series. The image series is generated by marking the analytes with markers in multiple coloring rounds and detecting the markers using a camera. The camera records an image of the image series in each coloring round. The markers are selected in such a way that image signals of an analyte in an image area over the image series include colored signals and uncolored signals. The method comprises the steps: extracting multiple signal series of an image area of the image series in each case, clustering the extracted signal series by means of a cluster analysis algorithm, the number of predefined clusters being at least equal to the number of types of analytes to be identified. By means of the cluster analysis algorithm that is carried out, one of the clusters is assigned to each signal series. The method further comprises determining a cluster center for each of the clusters, determining at least one target cluster center for each of the types of analytes to be identified, based on target series of a codebook, the codebook including a target series for each type of analyte to be identified, determining, for each of the cluster centers, distances of the cluster center from the target cluster centers, and assigning, based on the distances, the clusters to one of the types of analytes or to a background, and assigning the signal series to the type of analyte or to the background, based on the assignment of the determined cluster.

According to the present invention, an analyte is an entity whose presence or absence in a sample is to be specifically verified, and which is to be encoded if it is present. Any type of entity may be of interest, including a protein, a polypeptide, a protein, or a nucleic acid molecule (RNA, PNA, or DNA, for example), also referred to as a transcript. The analyte provides at least one site for specific binding with analyte-specific probes. Within the meaning of the invention, an analyte may comprise a complex of objects, for example at least two individual nucleic acid, protein, or peptide molecules. In one embodiment of the disclosure, an analyte does not include a chromosome. In another embodiment of the disclosure, an analyte does not include DNA. In some embodiments, an analyte may be an encoding sequence, a structural nucleotide sequence, or a structural nucleic acid molecule that relates to a nucleotide sequence that is translated into a polypeptide, generally via mRNA, when it is under the control of suitable regulatory sequences. The boundaries of the encoding sequence are determined by a translation start codon at the 5' terminus and a translation stop codon at the 3' terminus. An encoding sequence may include genomic DNA, cDNA, EST, and recombinant nucleotide sequences, but is not limited thereto. Such methods are referred to as spatial transcriptomics or also multi-omics, for example, depending on the type of analyte that is to be identified.

In the following discussion, the term "image signal" is to be understood such that either a value of a pixel of the image for a certain color of a predetermined color channel is intended, or that the image signal includes values of different basic colors of a color space of a color image.

According to the present invention, the spectral ranges, each of which contains a color of a marker, are also referred to as color channels. The images that are separated into the color channels are monochromatic images, and for each pixel contain the above-described image signal of the pixel in the color of the color channel as a value or measured value.

According to the present invention, a codebook includes, for each type of analyte, a sequence of markers which in the particular coloring rounds couple to the particular type of analyte.

In the following discussion, the term "signal series" is understood such that a succession of image signals of an image area over the coloring rounds is intended. The image signals of a signal series may be recorded in an experiment. However, the image signals of a signal series may, for example, also be artificially generated for training purposes, for example by means of a suitable simulation or by using generative models.

In conventional methods for identifying analytes in an image series, bright pixels over the image series are initially identified, and from the succession of bright pixels a signal series is created, and the signal series is directly matched to signal series in a codebook. The inventors have recognized that by means of a cluster analysis algorithm, clusters and cluster centers corresponding to the clusters may be determined, on the basis of which the signal series may be assigned to corresponding target cluster centers. It is thus possible to also identify analytes whose image signal is only slightly above a noise signal. In addition to the clustering of image areas that capture image signals of analytes, in the cluster analysis it is also possible for clusters to occur for image areas that capture a background, not an analyte. Similarly, signal series may be assigned to a type of analyte or to the background. If a distance between a signal series and the determined cluster centers is too large, a signal series may also be assigned directly to the background.

The particular distance may be a Euclidian distance in the space of the cluster analysis, or alternatively, the distance may also be normalized, for example, as a function of scattering of the values within a cluster. When determining the distance, entropy of the particular signal series or entropy of the distance vector may be taken into account.

The image signals of the signal series are preferably situated in an experiment feature space, and target signals of the target series are preferably situated in a reference feature space. In addition, the method comprises, prior to determining a distance between a cluster center and a target cluster center, conversion of the image signals from the experiment feature space into the reference feature space, the conversion taking place in particular prior to the clustering of the extracted signal series or after the clustering of the extracted signal series.

As a result of the entries of the target series and the image signals of the signal series being situated in different feature spaces, it is necessary to convert the image signals from the experiment feature space into the reference feature space. In addition, matching in the reference feature space is often simpler, since in the reference feature space, the signal series of image areas containing analytes may be more easily separated from signal series of background image areas. Therefore, converting the image signals of the signal series from the experiment feature space into the reference feature space allows simplified matching between the determined cluster centers and the target cluster centers.

For example, the experiment feature space is given by the signal level of an image signal in the particular coloring round, a spectral range of an observed fluorescence being additionally assigned to each coloring round, and thus to each image. The reference feature space may be the binary space, for example; in the present case, each entry in the target series is either a true value or a false value which indicates whether or not the analyte corresponding to the target series, in a coloring round corresponding to the entry, is to be marked with a marker. According to one alternative, a reference feature space is given by a particular fluorescent color of a marker. The analytes are marked in different hybridization series with differently colored markers. For each hybridization series, color recordings are taken in each case, corresponding to the markers used, as a function of the number of different marker colors in a corresponding number of coloring rounds. The target series then includes one entry for each hybridization series, for example, and the entries here indicate the color of the marker, for example, of if certain analytes are not marked, indicate a black value, for example zero or as the color black.

The image signals of the signal series and target signals of the target series are preferably each situated in an experiment feature space. The target signals of the target series originate from at least one reference recording of target image series, the reference recordings originating, for example, from an earlier experiment, an alternative computation method in which, for example, only a portion of the data is processed, or an experiment using an alternative recording method.

As a result of using reference recordings, based on target signals of a target series, for matching cluster centers with target cluster centers in the cluster analysis, a transformation from an experiment feature space into a reference feature space may be dispensed with, and in addition, matching is then accordingly simple.

The cluster analysis algorithm is preferably one of the following: k-means clustering, Gaussian mixed model (GMM) clustering, kernel-based principal component analysis, EM clustering, Leiden clustering, Louvain clustering, divisive analysis clustering.

As a result of using k-means clustering, for example, a clustering algorithm having good efficiency is used. When Gaussian mixed model clustering is used, in the output a posterior distribution is obtained which in a vector indicates belonging to the particular signal series for each cluster of the Gaussian mixed model.

The method preferably also includes, prior to the clustering of the extracted signal series, normalizing the signal series, the normalization including at least one of the following: normalizing the image signals over an entire image, normalizing the image signals over all images of the image series, or normalizing the image signals over a signal series.

As a result of normalizing the image signals over an entire image, it may be ensured that an average brightness in the images of the image series is always the same. This allows better searching, or facilitates good performance in the cluster analysis. Normalizing over all images of the image series or over image signals of a signal series also facilitates good clustering in the cluster analysis.

The image areas preferably each include only one pixel, an area of contiguous pixels, or a contiguous volume in an image stack.

As a result of the image areas including either individual pixels, contiguous pixels, or a contiguous volume in an image stack, an image area may contain individual or multiple pixels, as a function of the quality of the data or as a function of the magnification of a microscope that is used; the method for identifying analytes is thus made correspondingly flexible.

Image signals of image areas that contain more than one pixel are preferably combined, only an average value of an image area, a maximum value of an image area, or some other representative value of multiple neighboring pixels, for example, being used as the representative of an image signal.

Computing effort during the cluster analysis may be greatly reduced as a result of combining image signals of image areas that contain multiple pixels. A colored signal may be better recognized due to use of an average value or a maximum value as an image signal.

For example, a point spread function of the microscope may be designed in such a way that the image signals of an analyte are always mapped onto multiple pixels. Similarly, an analyte signal may be even better recognized by forming an average value or maximum value over multiple pixels.

The method preferably also includes, prior to the clustering of the extracted signal series by means of a cluster analysis, transforming the signal series by means of principal axis transformation or singular value decomposition, so that the transformed signal series is clustered by means of the cluster analysis.

As a result of transformed signal series being clustered by means of cluster analysis, for example certain background components that are extracted via the principal axis transformation or the singular value decomposition may accordingly be easily assigned in the cluster analysis, for which reason the clusters are better localized.

Preferably only one subset of the components of the transformed signal series is used in the cluster analysis.

It has been shown that in a suitable transformation, for example in the principal component analysis, a first component generates a very large variance in the transformed data, but does not contribute to separation of the analytes. This first component may also be interpreted as the brightness, and on the basis of this component either the remaining components may be normalized, or the first component may be directly omitted. As the result of omitting the first principal component, this spares performing a background correction, thus saving time in the further analysis.

A further aspect of the invention relates to a method for training a machine learning system, using a candidate extraction model for extracting candidate areas in an image series. The image series is generated by marking the analytes with markers in multiple coloring rounds and detecting the markers using a camera. The camera records an image of the image series in each of the coloring rounds. The markers are selected in such a way that image signals of an analyte in an image area over the image series include colored signals and uncolored signals. A candidate area is an image area in which the image signals of an analyte have been detected with a high probability. The method comprises the steps: providing an annotated data set and optimizing an objective function by adapting the model parameters of the candidate extraction model, the objective function detecting a difference between an output result that is output by the candidate extraction model and a target output, characterized in that the annotated data set includes at least one signal series of a candidate area as well as a signal series of a background image area, and for each of the signal series includes a target output that indicates whether or not the signal series image includes signals of an analyte.

As a result of training a candidate extraction model using signal series of a background image area and using signal series of image areas that capture an analyte, a candidate extraction model may be trained which efficiently and rapidly recognizes candidate signal series in signal series that have been extracted from the image series. Correspondingly, use of the candidate extraction model speeds up an analysis of the data of the image series, since the very computationally intensive matching to the codebook to determine a type of analyte of the candidate signal series only has to take place for the candidate signal series. In addition, by use of the candidate extraction model, it is also possible to recognize candidate signal series which do not include colored signals that are particularly bright, as is common in the prior art.

The candidate extraction model is preferably trained to identify candidate signal series based on a minimum number of colored signals, the colored and uncolored signals being identified based on at least one specified ratio of one of the colored and/or uncolored signals of the particular signal series to at least one other of the colored and/or uncolored signals of the particular signal series, and/or the candidate extraction model being trained to identify the candidate signal series in each case based on a characteristic signature that has the at least one specified ratio.

The inventors have recognized that the signal series of image areas that capture image signals of analytes each have at least one specified ratio between colored and/or uncolored signals of the particular signal series. For the candidate signal series, this results in a characteristic signature that has the at least one specified ratio of the colored and/or uncolored signals. Based on the specified ratio, colored and uncolored signals in a signal series may be recognized, and the number of colored signals in a signal series may thus also be determined, and it may thus be recognized whether a signal series includes the minimum number of colored signals. Based on the specified ratio or based on the characteristic signature, a candidate extraction model may be trained to identify the colored and uncolored signals as well as the candidate signal series in signal series of an image series. As the result of initially filtering out the signal series of a candidate area from all signal series before the particular signal series are matched with corresponding target series in order to determine a type of analyte of the particular analyte or of the particular candidate area, the computing effort in determining a type of analyte of a candidate area may be significantly reduced, since considerably fewer signal series have to be matched with a codebook.

The candidate extraction model is preferably a fully convolutional network, which as a classification model with fully connected layers, has been trained using signal series of individual image areas. After the training, the fully connected layers of the classification model are converted into the fully convolutional network using convolutional layers, and the fully convolutional network may simultaneously process the signal series of all image areas of the image series.

As a result of using a classification model with fully connected layers for training the candidate extraction model, during the training the required computing capacity is significantly reduced so that the training may be speeded up considerably, since the optimized model parameters of the classification model may then be used in the fully convolutional network. A fully convolutional network may then be used in the inference, which in turn increases throughput of the network.

The candidate extraction model is preferably a semantic segmentation model, and for each image of the image series the annotated data set includes a segmentation mask that assigns to each image area a value that indicates whether the image area is a candidate image area in which a candidate signal series over the image series has been captured, the value being, for example, a bit that indicates whether or not the image area is a candidate area.

As a result of the candidate extraction model being trained as a semantic segmentation model, it is possible, based on a class of the particular image area that is assigned according to the semantic segmentation model, to match a type of analyte of the candidate area, corresponding to a class of the signal series, against the codebook in an identification that follows the identification of candidate areas, based only on the class.

The segmentation mask preferably includes more than two classes: for example, a class in which from the outset a search is not made for candidate signal series, a class that assigns the image areas to the background, and a class including image areas in which candidate signal series have been found.

As a result of the segmentation mask including more than two classes, for example image areas outside of cells may be recognized directly from the model; in these image areas, a search is not even made for candidate signal series, which further speeds up the method and further saves computing power.

The candidate extraction model is preferably an image-to-image model, and a processing map that is learned by the candidate extraction model is an image-to-image map. The target output in the annotated data set is either a distance value that indicates the distance of the image area, corresponding to the particular signal series, from a closest candidate area, or is a probability value that indicates the probability that a candidate signal series has been captured in the image area.

As a result of the candidate extraction model being an image-to-image model, in the identification of signal series to be used for matching the signal series with the target series of a codebook, a threshold may be easily set based on the target output, so that, for example, in the inference of the model, signal series having a smallest possible distance value or a highest possible probability value are initially selected, and are successively inferred with increasing distance value or decreasing probability value until the number of found analytes corresponds to an expected number of found analytes.

The annotated data set for training of the image-to-image model preferably includes a probability map in which pixels are marked with analytes, and in which around the pixels including an analyte, a continuously decreasing, constant function with a maximum in the pixel including an analyte has been generated for the surrounding pixels which indicates a decreasing probability. The function may, for example, be a Gaussian function having a maximum for the pixel including an analyte.

It has been shown that it is very difficult to reliably train the candidate extraction model when the objects to be recognized are quasi-punctiform. The training may be greatly improved and stabilized by training using a Gaussian bell curve, for example.

The candidate extraction model is preferably implemented as a detection model that outputs a list of the candidate areas.

As a result of the candidate extraction model being implemented as a detection model, the output of the candidate extraction model contains very little data in particular with low occupancy, for which reason few data are used.

The annotated data set is preferably generated by means of at least one of the following: simulating signals of the various markers using a representative background image and a known point spread function of the microscope, generating the annotated data set by use of a generative model that has been trained on comparable data, recording reference images that include at least one background image, and for each of the background images, reference images that include at least one image in which each of the analytes to be identified is marked, and carrying out a conventional method for spatial analyte recognition.

By recording a representative background image of a sample for which the contained analytes are to be spatially determined in the further course of the method, and by simulating signals of the markers using the representative background image and a known point spread function of the microscope, an annotated data set having sufficient accuracy may be easily created, so that a suitable annotated data set that corresponds to the sample is present, by means of which a suitable candidate extraction model may be trained.

As a result of generative models being particularly well suited for artificially creating images, a high-quality annotated data set is created in a particularly efficient manner by generating an annotated data set by use of a generative model.

By recording reference images that contain a background image, and for each background, recording at least one other image in which each analyte to be identified is marked, an annotated data set may be correspondingly created for a particular background image, since in the at least one other image, all analytes to be identified are marked, and a distinction from the background image may thus be easily made.

As a result of carrying out a conventional method for spatial recognition of analytes prior to creation of the annotated data, a particularly realistic annotated data set may be created. Creating the annotated data set is then very computationally intensive, since the conventional evaluation methods are very computationally intensive. However, matching here is particularly reliable due to the fact that target series determined by use of the conventional method each contain recordings from a result feature space.

The annotated data set is preferably generated by means of the previously described method for identifying analytes and background by means of a cluster analysis algorithm.

As a result of the previously described method, for identifying analytes by means of a cluster analysis algorithm, assigning found analytes to a type of analyte in a particularly reliable manner, a particularly fully annotated data set may be created.

The method preferably also includes, prior to an input into the candidate extraction model, changing the order of the entries of the signal series of image areas that capture an analyte.

As a result of changing, during the training, the order of the entries of the signal series of image areas that capture image signals of an analyte, the candidate extraction model may be trained independently of a codebook that is established prior to the experiment, or independently of the order of the coloring rounds that is established prior to the experiment, and the candidate extraction model learns to identify only the specified ratios or the characteristic signatures based on the specified ratios, likewise independently of the order of the image signals in the signal series.

The optimizing of the objective function preferably includes multiple training sessions. A training session comprises selecting training data from the annotated data set, determining the objective function based on the training data, identifying signal series of a background area, misclassified as being in a candidate area, from a predetermined first radius around a candidate area, and using the identified, incorrectly assigned signal series as training data in a next training session, in addition to the training data selected in the next training session. In addition, the signal series misclassified as being in a candidate area are outside a predetermined second radius around the candidate area, the predetermined second radius being smaller than the predetermined first radius.

The inventors have noted that misidentification of the signal series as candidate signal series frequently occurs due to the fact that there is very little training data from the immediate vicinity around an image area that includes an analyte.

Therefore, the inventors recommend training, more frequently and in a targeted manner, signal series from a background area from the predetermined first radius around the image areas that capture image signals of an analyte, in order to also train the model for the correct identification of the signal series from a background area around the image areas that include analytes.

By taking into account signal series having a distance of greater than the predetermined second radius, and not taking into account signal series of image areas within the predetermined second radius, blurring of class boundaries between true-positive and false-positive candidate signal series may be achieved, since the signals of markers always extend over multiple pixels due to the point spread function of the microscope.

The training of a machine learning system using a candidate extraction model preferably includes complete training of the candidate extraction model or transfer learning of a pretrained candidate extraction model, the pretrained candidate extraction model being selected from a set of pretrained candidate extraction models based on a type of sample, a type of experiment, or a user ID.

As a result of the candidate extraction model being a pretrained candidate extraction model, the total amount of time spent on the training may be significantly reduced, and at the same time, highly specific candidate extraction models are thus trained with high accuracy during recognition of candidate areas.

Selecting a candidate extraction model from a set of pretrained candidate extraction models preferably includes checking whether the model is already sufficiently trained, and skipping further training.

As a result of initially checking whether a pretrained candidate extraction model is already sufficiently adapted for the new data, further training may be spared.

The signal series contained in the annotated data set are preferably transformed signal series that have been generated by means of principal axis transformation or singular value decomposition, the transformed signal series for the training being input into the candidate extraction model.

As a result of transformed signal series being input into the candidate extraction model, for example certain background components, which may be easily eliminated from the transformed signal series by means of principal axis transformation or singular value decomposition, may be eliminated, in a manner of speaking, via the transformation even prior to the input into the model, so that colored and uncolored signals or candidate signal series may be more easily recognized by the model.

A further aspect of the invention relates to a method for training a machine learning system, using a registration model for determining registration information from images of an image series. The registration information includes at least translation information and rotation information. The method comprises the steps: providing an annotated data set and optimizing an objective function by adapting the model parameters of the registration model, the objective function detecting a difference between a result registration output that is output by the registration model, and a target registration output. The annotated data set includes at least two images with registration structures, the registration structures being displaced and/or tilted relative to one another, and it being possible to register the registration structures with one another in the images, based on the target registration output.

In conventional methods for registering images, for example particularly bright pixels are initially selected, and the resulting point clouds are analytically registered with one another by use of an iterative closest point algorithm. The inventors have recognized that processing models such as neural networks, for example, may be trained very well to rapidly and effectively recognize recurring structures in image series. Therefore, the present invention provides a method that greatly speeds up the registration of image series.

The target output preferably directly includes the registration information, and the registration model is directly trained to register the images with one another.

As a result of the registration model being directly trained to output registration information, the registration process may be speeded up even further, since the entire registration may be carried out on a graphics card, for example.

The annotated data set preferably additionally includes a target intermediate output, the target intermediate output being used as a depth monitoring signal and depicting location information from the registration structures, and the objective function additionally detecting the difference between the target intermediate output of the annotated data set and an intermediate output of an intermediate layer of the registration model, corresponding to the target intermediate output.

As a result of the training being monitored by means of an intermediate output of the registration model, the training may be stabilized, and may possibly converge more quickly.

The target registration output preferably includes the location information of the registration structures; the registration model is trained to identify and locate the registration structures, and the objective function detects a difference between the location information contained in the annotated data set and the location information that is output by the registration model.

As a result of the registration model outputting location information of the registration structures, a user may easily monitor the outputs, which makes checking easier and more intuitive and thus simplifies an error analysis. In addition, the information concerning the recognized registration structures may also be used in the further course of the evaluation.

The image series is preferably generated by marking analytes with markers in multiple coloring rounds and detecting the markers using a camera, the camera recording an image of the image series in each coloring round, and the markers being selected in such a way that image signals of an analyte in an image area over the image series include colored signals and uncolored signals.

As a result of some image areas including colored and uncolored signals in the images of the image series, i.e., some image areas not being recognizable at all with respect to the background since they are not marked with a marker in the particular series, it is difficult for conventional algorithms to also reasonably recognize these pixels and register them with one another. However, since the registration model has been trained specifically with such image series, it can also easily recognize such patterns, and thus further improves the registration of image series from multiomic methods.

The annotated data set preferably includes at least one first image and one second image, the second image of the annotated data set having been computed from the first image by means of augmentation, the augmentation involving displacement, tilting, and/or distortion.

As a result of the registration model being trained using augmented images with an artificial displacement, an annotated data set may be created using simple means without having to record an entire image series beforehand. Thus, the stress on the sample and also the time for processing are reduced, since only an individual image or a few images have to be initially recorded.

The augmentation preferably includes generation of multiple second images, the generation of the second images also including generation of bright points in some of the images being registered with one another, the bright points being generated only in some of the second images.

As a result of generating the bright points only in some of the second images, the registration model may be directly trained to register the image series with signal series that include colored and uncolored signals, which improves the registration of the images of the image series and shortens the method, since recording an individual image is already sufficient as the basis for the augmentation for generating the annotated data set.

A further aspect of the invention relates to a method for identifying analytes in an image series, the image series being generated by marking the analytes with markers in multiple coloring rounds and detecting the markers using a camera. In each coloring round, the camera records an image of the image series. The markers are selected in such a way that image signals of an analyte in an image area over the image series include colored signals and uncolored signals. The method comprises: extracting in each case multiple signal series of an image area of the image series, filtering out candidate signal series from the extracted signal series, a ratio of at least one of the colored and/or uncolored signals of a candidate signal series to at least one other of the colored and/or uncolored signals of the particular signal series being a characteristic ratio, and/or a candidate signal series having a characteristic signature that has the at least one characteristic ratio, so that when the signal series has at least one characteristic ratio and/or the characteristic signature, the signal series is identified as a candidate signal series. If the signal series is identified as a candidate signal series, a type of analyte is assigned or identified based on the candidate signal series, or the candidate signal series is assigned to the background.

If a type of analyte is assigned to the candidate signal series, according to the present invention an analyte in the image area of the candidate signal series is identified.

According to the prior art, pixels having an image signal above a certain threshold value are identified in an image series. The threshold value is determined locally in each case within an image of the image series. The inventors have recognized that, besides the analytes in an image series that provide particularly bright image signals, there are even further analytes whose image signal differs only marginally from image signals in the direct surroundings of the pixels. Such candidate signal series may be identified based on the specified ratio of colored and/or uncolored signals to one another, or based on a characteristic signature within a signal series that has at least one specified ratio. As a result of the candidate extraction model having been trained to recognize the colored and uncolored signals within a signal series based on the specified ratio, or based on a characteristic signature that has the at least one specified ratio, it is possible by use of the method to also find analytes within a sample which, despite the marking with the markers, differ, at least in some of the coloring rounds, only slightly from a brightness of the remaining signals of the signal series and a brightness of surrounding pixels.

The filtering out of candidate signal series is preferably carried out by use of a candidate extraction model, the candidate extraction model being selected, for example, based on a type of sample from a set of candidate extraction models.

As a result of using a machine-learnable candidate extraction model for identifying candidate signal series or for identifying analyte areas, analyte areas or candidate signal series may be identified particularly efficiently in the image series.

The candidate extraction model has preferably been trained to identify the colored and uncolored signals based on at least one specified ratio of one of the colored and/or uncolored signals of the particular signal series to at least one other of the colored and/or uncolored signals of the particular signal series, and/or to identify the candidate signal series in each case based on a characteristic signature that has the at least one specified ratio.

The inventors have recognized that the signal series of image areas that capture image signals of analytes in each case have at least one specified ratio between colored and/or uncolored signals of the particular signal series, which for the candidate signal series results in a characteristic signature that has the at least one specified ratio of the colored and/or uncolored signals. Based on the specified ratio, colored and uncolored signals in a signal series may be recognized, and thus the number of colored signals in a signal series may also be determined. Based on the specified ratio or based on the characteristic signature, a candidate extraction model may be trained to identify the colored and uncolored signals as well as the candidate signal series in signal series of an image series; i.e., the candidate extraction model learns to recognize certain patterns. As a result of the signal series of a candidate area being initially filtered out from all signal series before the particular signal series are matched with corresponding target series in order to determine a type of analyte of the particular analyte or of the particular candidate area, the computing effort in determining a type of analyte of a candidate area may be significantly reduced, since considerably fewer signal series must be matched with a codebook.

The candidate extraction model is preferably a semantic segmentation model that assigns to each image area a value that indicates whether the image area captures an analyte, the value indicating, for example, a probability or a point value that the image area captures the image signal of an analyte, or the value is an image that indicates whether or not the image area is the image signal of an analyte.

As a result of the candidate extraction model being trained as a semantic segmentation model, the signal series may be matched against the codebook based only on the class, based on a class of the particular image area that is assigned according to the semantic segmentation model in an identification, following the identification of the candidate signal series, of a type of analyte corresponding to a class.

The segmentation mask preferably includes more than two classes: for example, a class in which candidate signal series are not searched for from the outset, a class that assigns the image areas to the background, and a class including image areas in which candidate signal series have been found.

As a result of the segmentation mask including more than two classes, for example image areas outside of cells may be directly recognized by the model; in these image areas, a search is not even made for candidate signal series, which further speeds up the method and saves additional computing power.

The candidate extraction model is preferably a patch classifier, which by use of a sliding window method assigns the value to each image area.

The candidate extraction model is preferably a fully convolutional network and has been trained as a classification model with fully connected layers, using signal series of individual image areas, and after the training, the classification model is converted into the fully convolutional network by replacing the fully connected layers with convolutional layers, and the fully convolutional network simultaneously processes the signal series of all image areas of the image series.

As a result of using a classification model with fully connected layers for training the candidate extraction model, during the training the required computing capacity is significantly reduced so that the training may be speeded up considerably, so that the optimized model parameters of the classification model may then be used in the fully convolutional network. A fully convolutional network may then be used in the inference, which in turn increases throughput of the network.

The candidate extraction model is preferably an image-to-image model that carries out image-to-image mapping, which assigns to each image area a distance value that indicates the distance of the image area from a closest image area that includes a candidate signal series, or that assigns to each pixel a probability of being an image area that includes a candidate signal series.

As a result of the candidate extraction model being an image-to-image model, in the identification of signal series to be used for matching the signal series with the target series of a codebook, a threshold may be easily set based on the target output, so that, for example, in the inference of the model, signal series having a smallest possible distance value or a highest possible probability value are initially selected, and are successively inferred with an increasing distance value or a decreasing probability value until the number of found analytes corresponds to the expected number of found analytes.

The candidate extraction model is preferably implemented as a detection model, and indicates a list of the candidate areas that capture the image signals of an analyte.

The image coordinates include spatial and temporal components, since the image series has spatial coordinates as well as temporal coordinates.

As a result of the candidate extraction model being implemented as a detection model, the output of the candidate extraction model contains very little data in particular with low occupancy, for which reason few data are used.

The method also preferably includes, prior to the checking for whether the signal series is a candidate signal series, a step of transforming the signal series by means of principal axis transformation or singular value decomposition, the transformed signal series being used in checking whether the signal series is a candidate signal series.

As a result of transformed signal series being input into the candidate extraction model, for example certain background components, which may be easily eliminated from the transformed signal series by means of principal axis transformation or singular value decomposition, may be eliminated, in a manner of speaking, via the transformation even prior to the input into the model, so that colored and uncolored signals or candidate signal series may be more easily recognized by the model.

The image areas preferably each include only one pixel, an area of contiguous pixels, or a contiguous volume in an image stack, the image signals of the image areas being input into the candidate extraction model as a tensor, for example.

As a result of combining multiple pixels into an image area, the required computing power during the evaluation of the signal series may be reduced. In contrast, a pixel-by-pixel evaluation possibly allows separation of closely situated image areas, which would merge with one another when the multiple pixels are combined.

Accordingly, a size of an image area may be selected as a function of an expected analyte density in the sample. A size of an image area may preferably vary over the entire image, in each case as a function of the analyte density that is expected in the image area.

As a result of selecting the size of an image area as a function of an expected analyte density, the required computing power may be optimized corresponding to an expected analyte density.

According to the present invention, when inputting signal series into a model, for example the processing model, either signal series of individual image areas may be input into the model, which is stated as the receptive field of the model then including only a single image area, or alternatively, the receptive field of the model may also include signal series of neighboring image areas. The model then processes the signal series of the particular image area based, among other things, on the image signals or signal series of the further image areas in the receptive field. It is also stated that the spatial context is incorporated into the processing of the image signals or of the signal series of the image area, in this case, specifically the image signals or signal series of the neighboring image areas that belong to the receptive field of the model.

The number of image areas in the receptive field may be selected, for example based on the point spread function of the microscope, in such a way that a diameter of the receptive field is not greater than, is only marginally greater than, or for example is twice as great as, a diameter of a region onto which a point in a sample is mapped due to the point spread function. For example, the size of the receptive field is 3×3, 5×5, 7×7, 9×9, 13×13, or 17×17 image areas; however, the size of the receptive field may also be 3×3×3, 5×5×5, 7×7×7, 9×9×9, 13×13×13, or 17×17×17 image areas when image stacks are incorporated into the coloring rounds.

The method preferably includes determining an image region. Determining an image region includes in particular combining neighboring image areas into an image region when the neighboring image areas have candidate signal series, the combining of neighboring image areas including non-maximum suppression, for example.

The computing effort for evaluating the image series may be significantly reduced by combining image areas into image regions and determining image region signal series.

The determining of an image region preferably also includes checking the image regions, the checking of the image regions including at least one of the following: separating the image region into two or more image regions when the image region exceeds a maximum size; determining an image region signal series for each of the image regions that arises from the separation; separating the image regions into two or more image regions when the image regions in each case are connected to one another by only a few bridge pixels, or, based on a shape of the image region, it is apparent that two image regions intersect here; determining an image region signal series for each of the image regions that arises from the separation; separating the image region based on analyte context information; and discarding image regions when an image region falls below a minimum size or has a shape that cannot be assigned to an analyte with certainty.

A maximum size is preferably selected as a function of an expected analyte density in such a way that for a high expected analyte density the maximum size is as small as possible, whereas for a low expected analyte density, larger maximum sizes are permissible. The maximum size may be selected in each case corresponding to a semantic segmentation of the image.

As a result of separating or discarding image regions according to certain criteria, the required computing power may be significantly reduced during checking of whether the signal series of the particular image region is a candidate signal series, as well as during identification of a type of analyte of the signal series; in addition, based on the separation, detecting multiple, in particular multiple different types of, analytes in an image region may be avoided.

The determining of an image region signal series preferably includes combining image signals of neighboring pixels into a combined image signal of the image region.

The determining of an image region preferably takes place after checking whether the signal series is a candidate signal series, and before identifying a type of analyte of the signal series and/or after identifying a type of analyte of the signal series.

As a result of the determining of the image regions being able to take place before as well as after identifying a type of analyte, this ensures, for example, that after the type of analyte is identified, separation of the image regions can still take place, for example when so many colored signals are found in an image region that multiple candidate signal series have possibly been captured in the image region.

Accordingly, separating the image regions allows improved identification of a type of analyte of a signal series.

The method preferably includes use of the identified type of analyte as analyte context information when determining the image region, the analyte context information including in particular: information concerning a size of an image region as a function of the type of analyte, information concerning a location of an image region in a sample, information concerning colocations of certain types of analytes in certain regions or in a location in a sample, or expected analyte densities as a function of a location in a sample or a location of an image area.

As a result of using in particular context information concerning an identified type of analyte when determining the image region, corrections in the determination may be made or errors in the determination may be corrected, even after the type of analyte of a signal series is identified.

For example, it is conceivable for certain types of analytes to occur only in certain regions of a sample, for example in certain regions of a cell. If the identification of a type of analyte now results, for example, in a first analyte with a first probability and a second type of analyte with a second probability, based on the context information it may be determined, for example, that the analyte definitely does not correspond to the first type of analyte, even if the probability, i.e., the first probability, is higher than the second probability.

The determining of an image region preferably takes place after checking whether the signal series is a candidate signal series, and before the candidate signal series are assigned to a type of analyte or to the background, and/or after the candidate signal series are assigned to a type of analyte or to the background.

As a result of also checking the signal region after the checking and also after assigning to the type of analyte, for an analyte determination that is not unambiguous, for example, the image region may still be altered in order to improve the determination of the type of analyte, if necessary.

The identifying of a type of analyte based on the signal series preferably includes determining a result bit sequence from the particular signal series, a true value being assigned to the colored signals and a false value being assigned to the uncolored signals in order to obtain the result bit sequence, and identifying the type of analyte based on the result bit sequence, the result bit sequence being compared to target bit sequences of a codebook that includes at least one target bit sequence for each of the types of analytes to be identified.

As a result of only signal series that have been identified as candidate signal series being further provided for identifying a type of analyte of the candidate signal series, significantly fewer computing resources are used for identifying a type of analyte. Binarization of the candidate signal series into result bit sequences allows particularly simple matching with the target bit sequences of a codebook.

The determining of a result bit sequence will preferably take place by use of a binarization model, which, for example, is a classification model that has been trained to output an output bit sequence as the result output, either a "hard" assignment to the result output taking place by the binarization model assigning a true value in the result bit sequence to the colored signals of the input signal series and assigning a false value in the result bit sequence to the uncolored signals of the input signal series, or a "soft" assignment taking place by the binarization model outputting a probability distribution in which a probability is assigned to each image signal of the signal series, which indicates the probability that the particular image signal of the signal series is a colored signal.

By use of a classification model, for example a convolutional neural network, result bit sequences may be generated in a particularly simple manner, and may be matched with the target bit sequences directly at the output of the classification model.

The method preferably includes adapting to a sensitivity, the sensitivity being adapted until the number of identified analytes corresponds approximately to an expected number of analytes.

As a result of being able to adapt a sensitivity parameter during the evaluation, sensitivity values may be defined in each case for the various methods used for the evaluation, in order to thus easily adapt the number of identified analytes corresponding to expectations.

The sensitivity is preferably in particular a model sensitivity of the candidate extraction model, via which the number of candidate signals identified in the extracted signal series may be set, or an identification sensitivity, via which a threshold value is set when identifying the type of analyte, and a candidate signal series being discarded as background when this threshold value is exceeded.

As a result of being able to set a model sensitivity as well as an identification sensitivity for the various steps of evaluating the extracted signal series, in each case either the checking of the signal series may be made correspondingly more sensitive, or an assignment to a type of analyte may be made.

The identifying of the type of analyte preferably takes place according to the previously described method for identifying analytes in an image series by means of a cluster analysis.

As a result of using a cluster analysis when identifying the type of analyte, all candidate signal series may be clearly matched to suitable cluster centers in a particularly thorough manner.

The method for identifying analytes in an image series preferably includes generating an expanded annotated data set, based on the extracted signal series and the assignment of the signal series to the particular type of analyte or to the background, and carrying out the above-described method for training a machine learning system, using at least the generated expanded annotated data set as the annotated data set.

As a result of the assigning of a type of analyte or the assigning of a signal series, identified as a candidate signal series, to a background taking place by use of a further method, after the particular type of analyte is identified or the candidate signal series is assigned to the background by use of an improved or expanded annotated data set, the candidate extraction model may be trained in such a way that it even better recognizes candidate signal series.

Image signals are preferably situated in an experiment feature space, and target image signals of the target bit sequence are preferably situated in a reference feature space. Therefore, the method also comprises, prior to comparing the candidate signal series to the signal series of the codebook, converting the candidate signal series from the experiment feature space into the reference feature space.

The method preferably also includes, prior to checking whether the signal series is a candidate signal series, a step of carrying out a background correction of the image signals of the image series, the carrying out of the background correction including one or more of the following: a rolling ball method, filtering, for example a top hat method, homomorphous filtering, low pass filtering, wherein the result of the low pass filtering is subtracted from the signal, or temporal filtering, background correction by use of an image-to-image model, background correction by use of mixed models, background correction by use of a mean shift method, background correction by use of principal component analysis, background correction by use of non-negative matrix factorization, or background correction by the excitation of autofluorescence by use of a nonspecific laser for all image areas of the image series.

As a result of the method comprising a background correction, the image signals of the signal series may be separated independently, and thus better, from the background, or computing effort is reduced, for example for the cluster analysis and during matching, since background contributions no longer have to be taken into account.

The extracting of the signal series preferably includes at least one of the following: extracting all image areas of the image series, extracting a random selection of the image areas of the image series, extracting a selection of the image areas of the image series that is weighted with a structural property of the image areas, for example weighted with a higher probability for cells, cell nuclei, and bright pixels, extracting image areas solely from image areas having a minimum level of image sharpness, and skipping over image areas in which no analytes are expected.

By skillful extraction of the image areas as described above, the effort for evaluating the image signals of the image series may be significantly reduced.

One method preferably also includes analyzing the quality of the images of the image series, repeating a recording of one of the images of the image series if the quality is not sufficiently high, the quality being determined, for example, based on one or more of the following: based on a relative signal strength of the images with respect to one another, based on pixels, present in the individual images, with image signals above a certain threshold value, based on an unexpected distribution of identified analytes, the analytes having been identified with a disproportionate frequency due to one certain image of the images of the image series, based on a machine-learned quality assessment model that has been trained to determine a quality assessment for an image, a partial image, or individual pixels or image areas.

As a result of the quality of the images being directly analyzed, the quality of the images may be ascertained and accordingly a recording may be repeated, even during an experiment when recording the images; often this is not possible after an experiment has concluded, since the samples are then no longer present in a desired state. Via the analysis of the quality of the images, the invention thus achieves increased reliability in determining analytes, since poorly recorded images may be immediately repeated.

A further aspect of the invention relates to a method for determining registration information from images of an image series by use of a registration model. The registration information includes at least translation information and rotation information. The registration model is trained to recognize registration structures in images. The registration structures are structures that occur in images, and to which a location may be unambiguously assigned. The method comprises the steps: inputting the image series into a registration model and determining the registration, based on the location information.

As a result of using a registration model for determining registration structures according to the method for determining registration information, in the registration of images of an image series it is possible to use not just particularly bright pixels for the registration; instead, a registration may also take place using extended structures. This improves continuous registration of the images relative to one another in comparison to registration of images by use of point clouds, known from the prior art.

The determining of the registration information preferably takes place in one step, and the registration model directly outputs the registration information.

As a result of the registration model directly determining the registration of the images of an image series, the invention provides a very efficient method for registering images, which may be completely implemented on a graphics card, for example.

The method preferably also includes identifying registration structures in the images of the image series, determining location information of the registration structures by use of the registration model, and providing the location information for each of the images, the determining of the registration information taking place based on the determined location information.

As a result of the registration model initially determining the location information of the registration structures, the registration is carried out in two steps, so to speak; it is easier for a user to verify, for example, the determined location information based on output images, and in addition the convergence of the model may be monitored during the training by use of the intermediate output, thus stabilizing the training of the model.

The image series has preferably been generated by marking analytes with markers in multiple coloring rounds and detecting the markers using a camera. The camera records an image of the image series in each coloring round. The markers are selected in such a way that signal series of an analyte in an image area over the image series include colored signals and uncolored signals, the colored and uncolored signals having at least one specified ratio of one of the colored and/or uncolored signals of the signal series to at least one other of the colored and/or uncolored signals of the signal series, and the signal series of an analyte having a characteristic signature that has the at least one specified ratio.

As a result of the registration model having been trained using image series that contain signal series that include colored and uncolored signals, the registration model may also register images of image series with one another, in which the registration structures to be registered with one another are not present in all images.

The registration model is preferably trained to recognize at least one of the following structures as the registration structures and to assign the location information: a cell border, cell organelles, cell nuclei, a cytoskeleton, mitochondria, image areas with brightness above a brightness threshold, structures having a minimum level of image sharpness, for example edges, mounting frames, cover slips, sample stages, sample holders, well plates, microtiter plates, and other non-sample structures.

While primarily spots are used in the prior art to register the images of an image series with one another in spatial analytomic methods, the present method according to the invention may register a plurality of structures, which arise in microscopic images, with one another.

The identifying of registration structures preferably includes a semantic segmentation of the images of the image series, and the determining of the registration includes registering the segmentation masks, output by the registration model, with one another.

As a result of the registration model being able to register segmentation masks with one another, large-surface structures in microscopic images may be registered with one another, for which reason registration in the area takes place continuously.

The identifying of the registration structures preferably includes determining a probability map, the probability map assigning to each pixel a probability of being a registration structure, so that the location information for each pixel includes the probability of being a registration structure, and the determining of the registration includes registering the probability maps of the images of the image series with one another.

As a result of the registration model outputting probability maps, a registration may take place precisely according to the determined probabilities, which further improves accuracy during the registration.

The identifying of registration structures preferably includes outputting location information of individual identified pixels having a registration structure, and the determining of the registration includes registering the location information of the individual pixels with one another. For example, an iterative closest point (ICP) algorithm is used to register the pixels.

The method preferably also includes classifying the identified registration structures by use of a classification model, the classification model assigning a class to the identified registration structures, on the basis of which the registration model decides whether it outputs a segmentation mask, a probability map, and/or location information of individual points for the identified registration structures.

The above-described method for filtering out candidate signal series preferably includes determining registration information from images of an image series according to the method described above.

As a result of registration information being initially determined during the filtering out of candidate signal series by use of a registration model, a registration of the images of the image series with one another may be significantly improved, which also significantly improves the finding of candidate signal series.

For the images of the image series, preferably at least two sets of various registration information are determined according to at least two of the methods described above for determining registration information. Filtering out candidate signal series and identifying types of analytes are then carried out, using each of the various sets of registration information. The various results upon identifying the types of analytes are then compared to an expected distribution of types of analytes, for example, and the registration whose result has better agreement with the expected distribution is selected.

The method preferably also includes adapting a scaling of the images of the image series to scaling of images in an annotated data set.

As a result of the images of the image series being adapted to a scaling of the annotated data set prior to processing, a particular processing model may recognize the particular structures more easily and with better correspondence to a trained map.

BRIEF DESCRIPTION OF THE FIGURES

The invention is explained in greater detail below based on the examples illustrated in the drawings. In the drawings:

FIG. 4 shows a schematic illustration of a processing model, as can be used according to several of the embodiments;

DETAILED DESCRIPTION OF THE EMBODIMENTS

Figure 1:
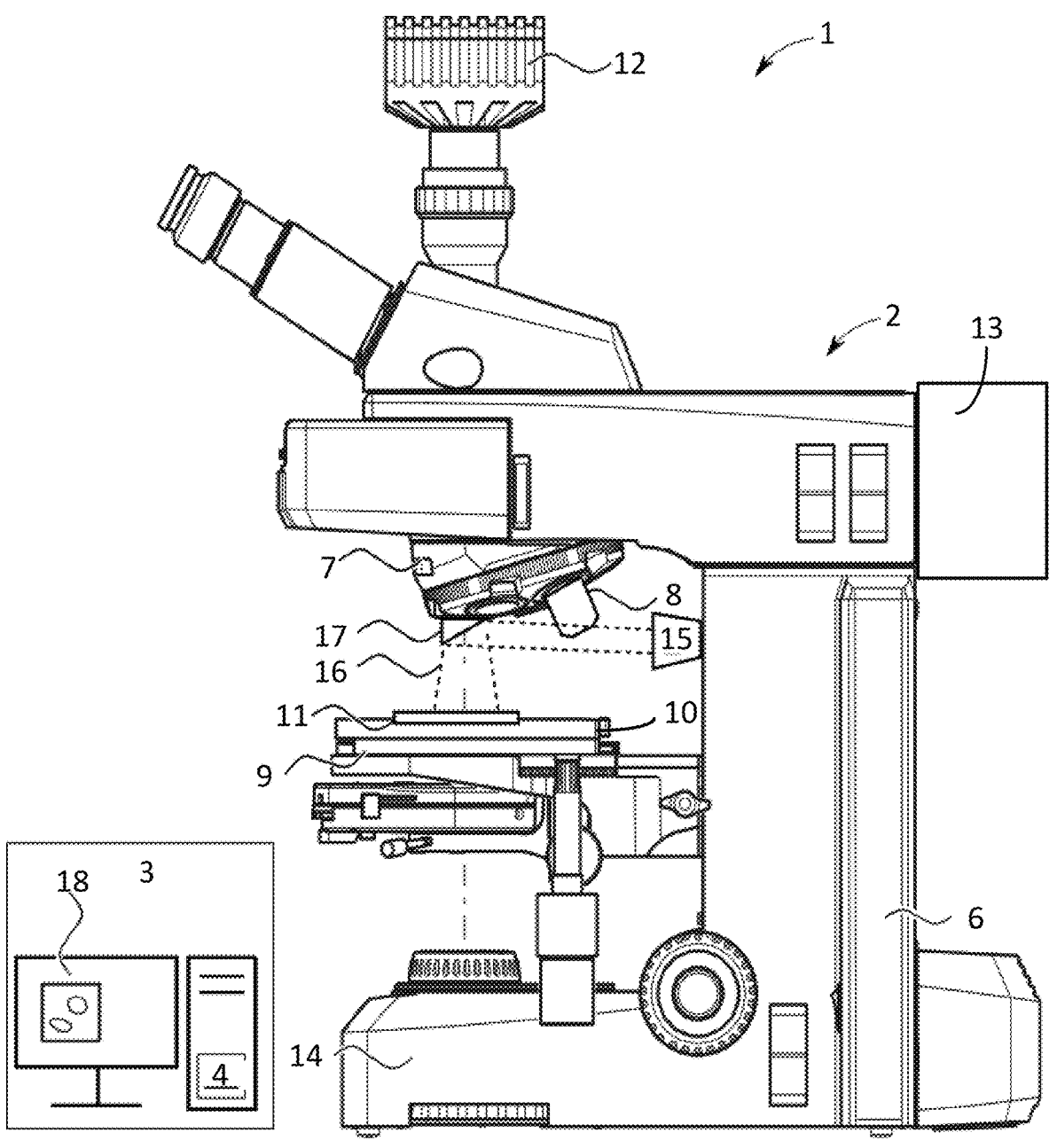
FIG. 1 schematically shows a system for use with the method for identifying analytes in an image series according to one embodiment.

One exemplary embodiment of an analyte data evaluation system 1 comprises a microscope 2, a control device 3, and an evaluation unit 4. The microscope 2 is communicatively coupled to the evaluation unit 4 (via a hard-wired or wireless communication link, for example). The evaluation unit 4 evaluates images 5. According to this embodiment, the images 5 detected by the microscope 2 are microscopic images 5 (FIG. 1). If the analyte data evaluation system 1 in particular includes a processing model, it is also referred to as a machine learning system 1.

The microscope 2 is an optical microscope. The microscope 2 includes a stand 6 which includes further microscope components. The further microscope components are in particular an objective changer or objective revolver 7 with a mounted objective 8, a sample stage 9 with a mounting frame 10 for holding a sample carrier 11, and a microscope camera 12.

When a sample is fixed into the sample carrier 11 and the objective 8 is swiveled into the microscope beam path, for fluorescence recordings a fluorescent illumination device 13 may illuminate the sample, and the microscope camera 12 receives the fluorescent light as detection light from the fixed sample, and may record a microscopic image 5 in a fluorescence contrast. If the microscope 2 is to be used for transmitted light microscopy, a transmitted light illumination device 14 may be used to illuminate the sample. The microscope camera 12 receives the detection light after passing through the fixed sample and records a microscopic image 5. Samples may be any given objects, fluids, or structures.

The microscope 2 optionally includes an overview camera 15 with which overview images of a sample environment may be recorded. The overview images show the sample carrier 11, for example. A visual field 16 of the overview camera 15 is larger than a visual field 16 for recording a microscopic image 5 with the microscope camera 12. The overview camera 15 views the sample carrier 11 by means of a mirror 17. The mirror 17 is situated at the objective revolver 7, and may be selected instead of the objective 8.

According to this embodiment, the control device 3, as schematically illustrated in FIG. 1, includes a screen 18 and the evaluation unit 4. The control device 3 is configured to control the microscope 2 for recording image series 19 of microscopic images 5, and to store the image series 19 recorded by the microscope camera 12 on a memory module 20 of the evaluation unit 4, and to display the image series on the screen 18 as needed. The recorded microscopic images 5 are then further processed by the evaluation unit 4.

The evaluation unit 4 includes various modules that exchange data via channels 21. The channels 21 are logical data links between the individual modules. The modules may be designed as software modules and also as hardware modules.

The evaluation unit 4 includes the memory module 20. The memory module 20 stores the microscopic images 5 recorded by the microscope 2 and manages the data to be evaluated in the evaluation unit 4.

The evaluation unit 4 includes the memory module 20, by means of which image data of the image series 19 are kept and stored. A cluster analysis control module 22 reads out image data of the image series 19 and also a codebook 23 from the memory module 20, and relays the image data and the codebook 23 to a cluster analysis module 24.

The cluster analysis module 24 analyzes the image data by means of a cluster analysis algorithm, for example k-means clustering, Gaussian mixed model (GMM) clustering, kernel-based principal component analysis clustering, EM clustering, Leiden clustering, Louvain clustering, or divisive analysis clustering. The cluster analysis module 24 either assigns a type of analyte in each case to the image data, i.e., image areas 25 of the image series 19, or identifies the image area 25 as a background image area 26.

After the cluster analysis, the cluster analysis module 24 returns the analyzed image data to the cluster analysis control module 22, and the cluster analysis control module 22 stores the analysis result in the memory module 20.

In addition, the evaluation unit 4 includes a registration control module 27 and a registration module 28. The registration control module 27 reads out the microscopic images 5 of the image series 19 from the memory module 20 and determines registration information for the microscopic images 5 of the image series 19.

According to one embodiment, the registration information is determined by a registration model, which is implemented as a neural network, for example. The training of the registration model is controlled by the registration control module 27. During the training, the registration control module 27 reads out a portion of the data of an annotated data set from the memory module 20 and inputs it into the registration model. Based on outputs of the registration model and target data in the annotated data set, the registration control module 27 determines the objective function and optimizes model parameters of the registration model, based on the determined objective function.

The training takes place by use of a stochastic gradient descent method, for example. Any other training method may also be used. When the training ends, the registration control module 27 stores the model parameters of the registration model in the memory module 20.

The memory module 20 may include a set of trained registration models, for example, a registration model being determined, for example, based on context information of an experiment or of an examined sample.

During the inference, either the registration module 28 returns the registration information to the registration control module 27, which stores the registration information in the memory module 20, or the registration module 28 relays the registration information, together with the image series 19, to a candidate extraction control module 29.

The candidate extraction control module 29 controls a candidate extraction module 30. The candidate extraction module 30 is configured to extract in each case multiple signal series 31 of an image area 25 of the image series 19 from the image data of the image series 19, and to filter out candidate signal series from the extracted signal series 31, candidate signal series being signal series 31 of image areas 25 that have captured image signals of analytes 39 with a high probability; i.e., in a portion of the image series 19 the signal series 31 contains image signals of markers that are coupled to an analyte 39. The candidate extraction module 30 includes, for example, a candidate extraction model that has been trained to filter out candidate signal series in the extracted signal series 31.

During the training, the candidate extraction control module 29 reads out a portion of the data of an annotated data set from the memory module 20 and inputs it into the candidate extraction module 30. The candidate extraction control module 29 determines, based on outputs of the candidate extraction model and target data in the annotated data set, the objective function, and optimizes model parameters of the candidate extraction model, based on the determined objective function.

The training takes place by use of a stochastic gradient descent method, for example. Any other training method may also be used. When the training ends, the candidate extraction control module 29 stores the model parameters of the candidate extraction model in the memory module 20.

During the inference, the candidate extraction module 30 relays the candidate signal series, output by the candidate extraction model, to an assignment control module 32.

The assignment control module 32 relays the candidate signal series to an assignment module 33. The assignment module 33 assigns a type of analyte to the candidate signal series, the assignment control module 32 relaying, in addition to the candidate signal series, the codebook 23 to the assignment module 33. Based on the codebook 23, the assignment module 33 compares the candidate signal series to target bit sequences of the codebook 23, and, as a function of agreement of the candidate signal series with the target bit sequences of the codebook 23, either assigns a type of analyte to the candidate signal series, or assigns the candidate signal series to the background.

According to one embodiment, the assignment module 33 includes a classification model that is implemented as a neural network and that has been trained to assign a type of analyte to the candidate signal series, or to assign the candidate signal series to the background.

During the inference, the assignment module 33 relays to an output module 34 the results of the assignment of the type of analyte to the candidate signal series. The output module 34 stores the results of the analysis in the memory module 20.

A training of the classification model is controlled by the assignment control module 32. The assignment control module 32 reads out data from an annotated data set, and for the training inputs it into the classification model. Based on the outputs of the classification model and target outputs contained in the annotated data set, the assignment control module 32 computes the objective function and optimizes model parameters of the classification model, based on the objective function.

After the training, the model parameters of the classification model are stored in the memory module 20 by means of the assignment control module 32.

Figure 4:
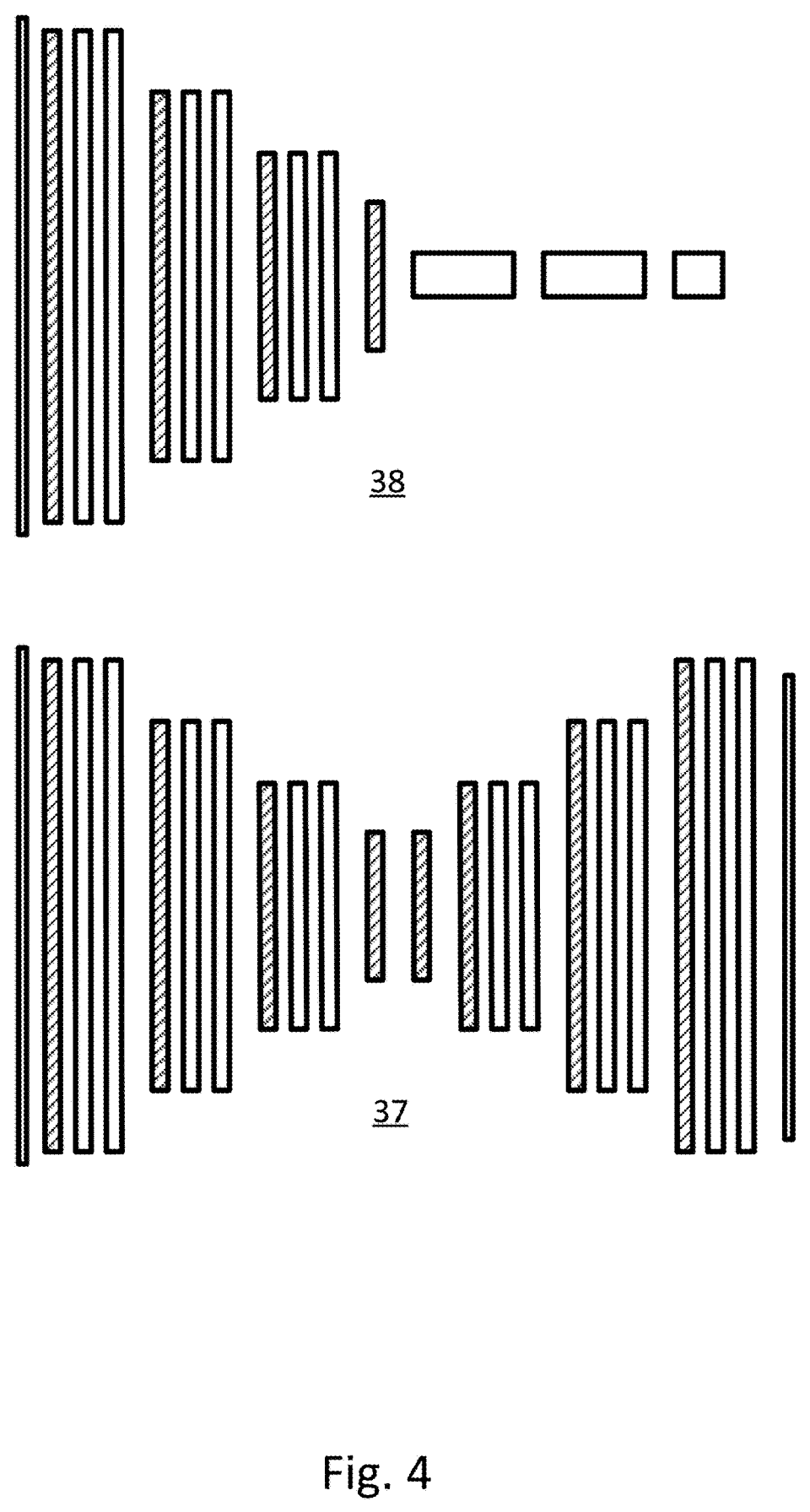

A method for operating the analyte data evaluation system 1 (FIG. 4) is described below.

In the described method for operating the analyte data evaluation system 1, annotated data sets are first generated in a step S1. For this purpose, the microscope camera 12 initially records an image series 19. For recording the image series 19, the analytes 39 in a sample are marked in multiple coloring rounds in such a way that for image areas 25 that capture image signals of an analyte 39, a signal series 31 that contains colored signals and uncolored signals results over the image series 19, the markers being selected in such a way that a succession of colored signals and uncolored signals results for the signal series 31 of a certain type of analyte, corresponding to a target bit sequence of the type of analyte in the codebook 23.

According to the present invention, markers are coupled to analytes 39 and then detected using the microscope camera 12. During the coupling of the markers to the analytes 39, various analytes 39 may be marked with markers using different fluorescent dyes, for which reason after the coupling, a number of microscopic images 5 are recorded, in each case with a different fluorescence contrast corresponding to the number of different fluorescent dyes. Each of these recordings corresponds to a coloring round. After the microscopic images 5 are recorded, the markers are decoupled from the analytes 39. After the markers have been decoupled from the analytes 39, the analytes 39 may be remarked with new markers. During the renewed coupling of markers to analytes 39, this time differently colored markers may in each case couple to analytes 39. In individual series of the various series in which markers are coupled to the analytes 39, some of the analytes 39 to be identified may not even be marked with a marker at all. A signal series 31 that is expected for a certain analyte 39 or a certain type of analyte is obtained from the resulting patterns of colored and uncolored signals, in each case with regard to a fluorescent color. These expected signal series 31 are summarized in the codebook 23 for all types of analytes to be identified.

After the image series 19 is recorded, microscopic images 5 of the image series 19 are registered with one another. For this purpose, a conventional registration algorithm, which is implemented by means of the registration module 28, is first applied. In a conventional registration algorithm, brightly illuminated pixels are identified in the images of the image series 19, and resulting point clouds are registered with one another, for example using an ICP algorithm. After the registration module 28 has registered the microscope images 5 of the image series 19 that are registered with one another, the microscopic images 5 of the image series 19 that are registered with one another are stored in the memory module 20 by means of the registration control module 27.

In addition, the registration control module 27 may create, from the image series 19 with microscopic images 5 that are registered with one another, an annotated data set for training one or more registration models.

After the registered microscopic images 5 of the image series 19 are stored in the memory module 20, the cluster analysis control module 22 reads out the image series 19 and relays the image series 19 to the cluster analysis module 24. In addition, the cluster analysis control module 22 reads out the codebook 23 from the memory module 20 and relays the codebook 23 to the cluster analysis module 24. The cluster analysis module 24 carries out a cluster analysis by use of Gaussian mixed model clustering. In the cluster analysis, signal series 31 are initially extracted from the image series 19 and clustered.

The cluster analysis module 24 determines a cluster center for each of the found clusters. In addition, the cluster analysis module 24 determines target cluster centers for each of the target bit sequences 35 in the codebook 23. The cluster analysis module 24 then determines distances between the cluster centers and the target cluster centers. For mixed distribution models such as GMM, an ascertained posterior distribution in a vector indicates the belonging to each cluster in the mixed distribution model. Thus, in mixed distribution models, not only is a distance determined, but also the distance is incorporated into the posterior distribution, and the extent of the particular clusters is incorporated into the probability of belonging to the particular target cluster.

The cluster analysis module 24 may subsequently assign a type of analyte to each signal series 31, corresponding to an associated cluster. In addition to the clusters that belong to a certain type of analyte, clusters that are to be assigned to the background, i.e., pixels without image signals of markers coupled to analytes, also occur in the cluster analysis. As a function of the posterior distribution and of a distance of a signal series 31 from a cluster center of the particular cluster, the cluster analysis module 24 may also assign signal series 31 of image areas 25, which are far from a cluster center, to the background. For this purpose, a threshold value may be set in the cluster analysis module 24.

After the cluster analysis, the cluster analysis module 24 returns results of the cluster analysis to the cluster analysis control module 22. The cluster analysis control module 22 stores the results of the cluster analysis in the memory module 20. In addition, the cluster analysis control module 22 creates an annotated data set for training the candidate extraction model, and an annotated data set for training the assignment model.

As an alternative to the Gaussian mixed model clustering, the cluster analysis module 24 may also use an alternative clustering method or an alternative clustering algorithm, for example k-means clustering, kernel-based principal component analysis clustering, EM clustering, Leiden clustering, Louvain clustering, or divisive analysis clustering.

Before the cluster analysis is carried out, the image signals of the signal series 31 may still be normalized with respect to one another; for example, the image signals may be normalized over a microscopic image 5, over the entire image series 19, or merely over a signal series 31.

According to this embodiment, the cluster analysis is carried out individually for each pixel. Alternatively, however, an area of contiguous pixels for which a representative signal series 31 has been extracted, for example by average value formation or maximum value formation, may take place.

During recording of the image series 19, an image stack is recorded in each coloring round. Accordingly, instead of individual pixels, a signal series 31 for a contiguous volume of pixels in the image stack may be extracted for the cluster analysis.

The extracted signal series 31 may either be used as unprocessed image signals in the cluster analysis, or the signal series 31 may be transformed, for example by means of principal axis transformation or singular value decomposition, before the cluster analysis is carried out using the cluster analysis module 24.

According to this embodiment, the codebook 23 is present as a collection of target bit sequences 35. The target bit sequences 35 and the signal series 31 are thus situated in different feature spaces: an experiment feature space and a reference feature space. Therefore, a transformation of the signal series 31 into the reference feature space takes place before the cluster centers are compared to the target cluster centers. Alternatively, however, a codebook 23 containing reference signal series from a previous experiment may also be present. In this case, the reference signal series and the signal series 31 are situated in the same feature space, and the feature space transformation may be dispensed with.

After the cluster analysis control module 22 has stored the annotated data set for training the candidate extraction model and the annotated data set for training the assignment model in the memory module 20, a training phase may follow the creation of annotated data sets.

The training of the registration model, of the candidate extraction model, and of the assignment model is carried out in a step S2.

According to this embodiment, the registration model is trained to identify bright points in the microscopic images 5 of the image series 19 and to output the location information of the bright pixels. According to this embodiment, the registration structures are accordingly the bright pixels. For example, for each of the microscopic images 5 of the image series 19, the registration model may output a bit mask in which bright pixels are marked. The resulting point cloud is analyzed using a conventional method, and outputs the registration information to the registration control module 27. The registration information includes at least translation information and rotation information, the translation information and rotation information in each case indicating a translation or rotation of one image with respect to another image, in order to achieve congruence of the determined point clouds of the images to be registered with one another.

In addition to the translation information and rotation information, the registration information may also include information concerning, for example, a linear global transformation, representable by a transformation matrix, which also includes affine transformations and shearings, information concerning local transformations, global or local non-linear transformations, and intrinsic camera parameters (for example, distortion correction, numerical or chromatic aperture of the camera).

According to one alternative, the registration information may be output in each case for each image, or registered images are computed and only the registered images are stored. Storing the registration information in addition to the images has the advantage that the registration information may be subsequently checked, even though storing the registration information takes up additional memory.

According to one alternative, the registration model may also determine the registration information directly. In this case, the registration model is directly trained to register the microscopic images 5 of the image series 19 with one another. Such a model is also referred to as an end-to-end registration model.

Accordingly, as inputs into the registration model the annotated data set includes the previously recorded microscopic images 5 of the image series 19 as well as corresponding target bit masks that have been created using a conventional registration process.

An annotated data set with which the end-to-end registration model is trained includes, for example, a set of microscopic images 5, not registered with one another, as model input, and a set of microscopic images 5, registered with one another, as target output. Alternatively, the annotated data set may include the microscopic images 5, not registered with one another, and the registration information instead of the microscopic images 5 that are registered with one another.

During the training, the registration control module 27 reads out a portion of the microscopic images 5 of the image series 19, detects a difference between a bit mask that is output by the registration model and a target bit mask by use of an objective function, and optimizes the registration model by adapting the model parameters of the registration model. The training takes place, for example, in multiple steps by means of a stochastic gradient method.

As soon as the registration control module 27 establishes that the registration model is sufficiently optimized, the registration control module 27 ends the training of the registration model and inputs the model parameters of the registration model into the memory module 20 for later use.

As described above, the registration model is trained to create a registration for images 5 of an image series 19, even if all bright pixels are not contained in all images in the image series 19, since the markers have been selected in such a way that colored signals and uncolored signals occur over the image series 19 in a signal series of an analyte 39 in an image area 25.

Figure 2:
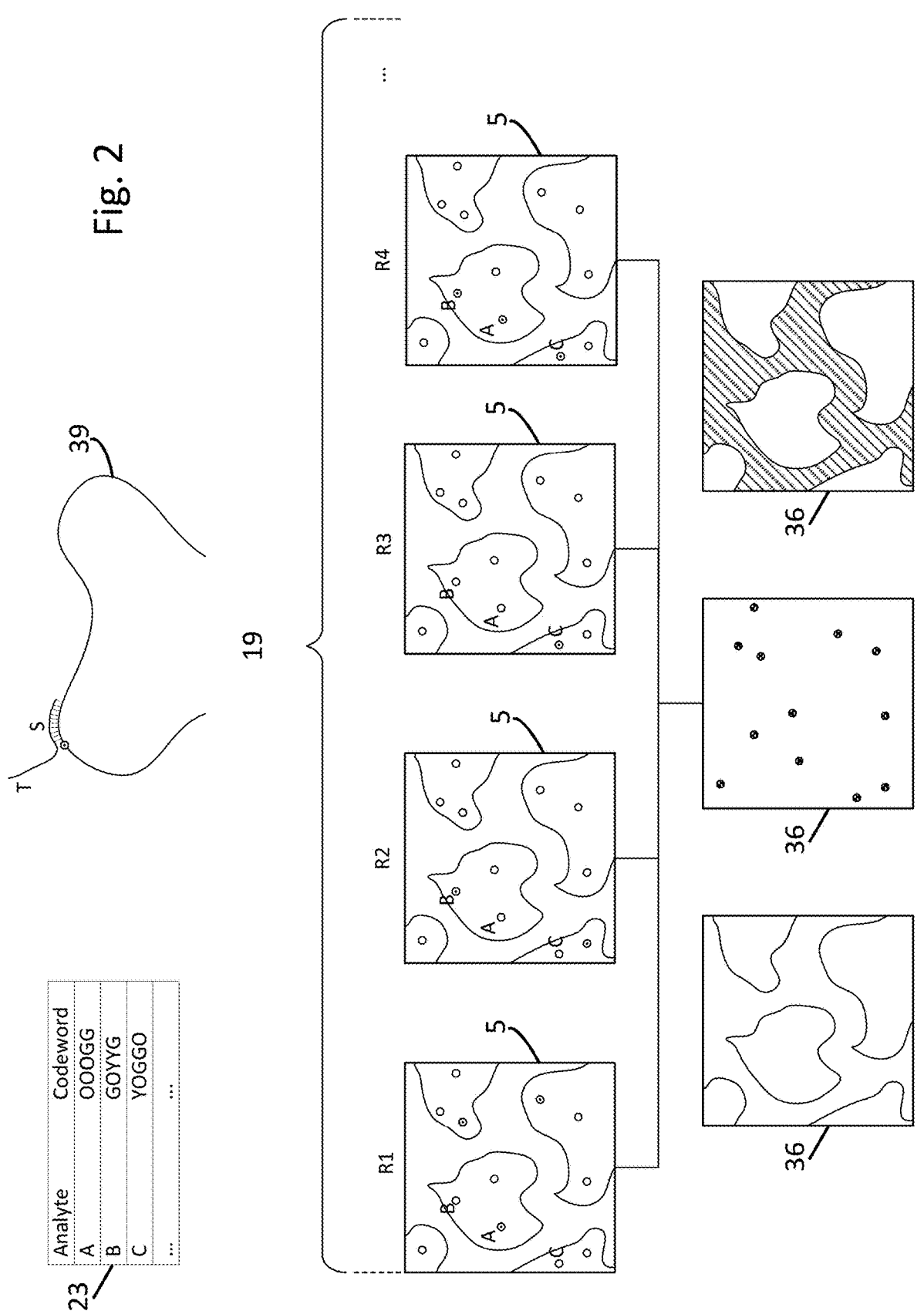
FIG. 2 schematically shows a method for generating an image series by marking analytes with markers in multiple coloring rounds and detecting the markers using a camera, as carried out prior to identifying analytes in the image series.

According to one alternative, the registration model is trained to semantically segment the microscopic images 5 of the image series 19. If the samples comprise biological cells, these cells have cell borders, for example. The registration model is trained to output a segmentation mask 36 that emphasizes the cell borders (see FIG. 2). According to this alternative, the registration structures are then specifically the cell borders.

In order for the registration model to be trainable for creating segmentation masks 36, the annotated data set must contain appropriately segmented microscopic images 5. These may be created by hand, for example, using a pre-trained model or using some other method for creating semantic segmentations.

For this alternative, the registration model outputs the segmentation mask 36 with emphasized cell borders for each of the microscopic images 5 of the image series 19. The segmentation masks 36 may then be brought into congruence by use of a conventional method. The conventional method outputs at least translation information and rotation information for the microscopic images 5 of the image series 19.

During the training, the registration control module 27 reads out a portion of the microscopic images 5 of the image series 19, detects a difference between a segmentation mask 36 that is output by the registration model and a target segmentation mask 36 contained in the annotated data set by use of an objective function, and optimizes the objective function by adapting the model parameters of the registration model.

According to further alternatives, the registration model may also be trained to carry out image-to-image mapping, which for each microscopic image 5 of the image series 19 outputs a probability map that indicates a probability that the particular pixel is a registration structure. A method for creating such probability maps is described in DE 10 2018 133 188 A1, for example.

According to further alternatives, the registration structures may be, for example, cell organelles, cell nuclei, a cytoskeleton, mitochondria, structures having a minimum level of image sharpness, for example any given edges, mounting frames 10, cover slips, sample stages 9, sample holders, well plates, microtiter plates, and other non-sample structures.

According to a further alternative, the registration module 28 may also be provided with multiple registration models. For the multiple registration models, the registration module 28 then additionally includes a classification model. The classification model assigns a class to each pixel of the image series 19, on the basis of which a corresponding registration model is selected for the particular pixel. For example, structures with unsharp edges are better suited to be registered with one another by use of a probability map.

In contrast, sharp structures such as cell borders may be recognized very well by use of semantic segmentation and correspondingly registered with one another.

If the registration module 28 includes multiple registration models, each of the models must be independently trained. According to one alternative, multiple sets of registration information may be determined from a plurality of the registration models. In a subsequent step in the method, the multiple sets of registration information may be used in parallel with one another in order to determine, for example, candidate signal series and/or types of analytes in each case, using the various items of registration information. Based on the obtained candidate signal series and/or types of analytes, an assessment is then made concerning which of the sets of registration information is the best of the sets of registration information.

According to a further alternative, in addition to the microscopic images 5 not registered with one another, and the microscopic images 5 registered with one another, an annotated data set for training a registration model may also include location information of registration structures. The registration structures correspond to outputs of an intermediate layer of the end-to-end registration model, which is trained to output location information of the registration structures. In the subsequent layers, registration information is generated from the determined location information. The training of the generation of the registration information is then monitored by means of the output layer. An end-to-end registration model is thus trained in which the registration process takes place in two stages.

During the training of the registration models described above, the registration control module 27 may in each case also input only portions of microscopic images 5 of the image series 19 of the annotated data set into the particular registration model. For example, the end-to-end registration model may be a convolutional network that is trained on partial images, and after establishing the model parameters, i.e., after the training, the convolutional network may be converted into a fully convolutional network 37 and may deliver registrations for entire microscopic images 5 of the image series 19.

Furthermore, for training the registration model, an annotated data set may be constructed based on an individual recorded image 5. For this purpose, the individual recorded microscopic image 5, referred to below as the first microscopic image 5, is converted into a second microscopic image 5 by augmentation. The augmentation for constructing the second microscopic image may involve displacement, tilting, or also distortion, for example.

According to one alternative, multiple second microscopic images 5 may also be constructed, wherein bright points that are present only in a portion of the second microscopic images 5 are supplemented, in each case at the same points of the original first microscopic image 5. By use of the annotated data set constructed in this way, the registration model may be directly trained to register microscopic images 5 of an image series 19, using candidate signal series in which colored and uncolored signals occur.

In addition to the training of a registration model or several of the registration models, step S2 also includes training a candidate extraction model.

According to this embodiment, the candidate extraction model is trained to identify candidate signal series based on the number of colored signals, or to identify the candidate signal series, in each case based on a characteristic signature having at least one specified ratio. In order to distinguish the colored signals from the uncolored signals, the candidate extraction model learns to recognize in a candidate signal series at least one specified ratio of colored signal to uncolored signals, of a colored signal to a colored signal, of an uncolored signal to a colored signal, or of an uncolored signal to an uncolored signal. That is, a candidate signal series has at least one specified ratio of a colored signal and/or uncolored signal of the particular signal series to at least one other of the colored signals and/or uncolored signals of the particular signal series 31.

The specified ratio may be a certain distance between the image signals, a quotient of the image signals, or a certain number of image signals that have a higher image signal than the others, it being possible for the ratio to be learned in each case for a normalized image signal or for an unnormalized image signal. Whereas in the prior art, in particular image signals of very bright pixels are considered, the inventors have found that signal series of pixels that capture image signals of analytes 39 have image signals with the specified ratio described above, or that the signal series 31 each have the characteristic signature. Analytically, the characteristic signature is difficult to define and may be different for various types of analytes; however, it has been shown that with adequate training, neural networks may identify the characteristic signature or the specified ratio very well.

In order to recognize the number of colored signals in a candidate signal series, an annotated data set must include signal series 31 of an image area 25 in which the image signals of an analyte 39 have been captured, wherein colored signals and uncolored signals of the signal series 31 have the specified ratio or the characteristic signature. In addition, the annotated data set includes signal series 31 of the background image areas 26. Background image areas 26 only occasionally contain colored signals, which are usually attributable to non-remote or miscoupled markers.

According to the first embodiment, the candidate extraction model is a fully convolutional network 37. The candidate extraction model is initially trained as a classification model that is a fully connected network 38 with fully connected layers, including signal series 31 of individual image areas 25. For this purpose, the candidate extraction control module 29 inputs signal series 31 of the annotated data set into the candidate extraction model. The classification model assigns to the signal series 31 a class that indicates whether the signal series 31 is a candidate signal series. A candidate signal series is a signal series that either has the characteristic signature or has the characteristic signature with a high probability, or has the colored signals or uncolored signals with the specified ratio.

The classification model may be a binary classifier, which then, for example, indicates a "1" which is a candidate signal series; however, the class assignment may also take place in a "soft" manner, in which for each class, the classification model outputs a probability of belonging to the particular class.

The candidate extraction control module 29 in turn controls the training by reading out a portion of the signal series 31 from the annotated data set, supplies the signal series 31 to the classification model, and detects a difference between the output of the classification model and a target output by use of an objective function. In addition, the candidate extraction control module 29 optimizes the objective function based on the model parameters of the classification model.

When the classification model is completely trained using the fully connected layers, the fully connected layers are converted into fully convolutional layers. The resulting fully convolutional network may then process a complete image series 19 as input. As output, the completely trained classification model or the network which is then converted to the fully convolutional network outputs a segmentation mask 36, for example, in which all image areas 25 containing candidate signal series are emphasized (see FIG. 2, lower center).

According to one alternative, the candidate extraction model may also be an image-to-image model that learns an image-to-image map. A target output in the annotated data set is then either a distance value that indicates the distance of the particular image area 25 from a closest image area 25 containing a candidate image series, or is a probability value that indicates the level of probability that the image area 25 captures a candidate image series.

According to a further alternative, the candidate extraction model is a detection model. The detection model outputs only a list of the image areas 25 that capture a candidate signal series.

According to the embodiment, after the objective function is determined, the control module 22 may identify signal series 31 that have been misclassified as candidate signal series and that originate from an image area 25 that lies within a first predetermined radius around an image area 25 that has actually captured a candidate signal series. Since the signal series 31 are randomly selected from the annotated data set, it is possible that only a few signal series 31, used for the training, lie within the first predetermined radius. It is difficult to correctly classify such signal series 31 due to the small number in the particular training set for the candidate extraction model. To improve recognition of these signal series 31 misclassified as candidate signal series, in a subsequent training session these signal series 31 misclassified as candidate signal series are automatically incorporated into a data set to be trained in order to increase their weight in the objective function. This method is also referred to as "hard negative mining."

According to one modification, the signal series of pixels [lying] within a second predetermined radius that is smaller than the first predetermined radius and directly next to an image area 25, and that correctly captures a candidate signal series, optionally may not be accepted into the subsequent training session for the hard negative mining. According to the point spread function of microscopes 2, the signals of markers typically extend over multiple pixels. If signal series 31 of pixels lying within the second predetermined radius were likewise used for hard negative mining, this would result in blurring of the class boundaries, which should be avoided.

According to a further alternative, the annotated data set may be generated using other means instead of using the cluster analysis control module 22. For example, the signals of the various markers may be simulated using a representative background image and a known point spread function of the microscope 2. The codebook 23 is also entered into such a simulation. Alternatively, a generative model may be trained to generate the annotated data set. Since generative models are particularly well suited for generating microscopic images 5, a particularly realistic annotated data set may be created using a generative model. In addition, one or more reference images that contain at least one background image may also be recorded, and for each background image at least one microscopic image 5 in which analytes 39 to be identified are coupled to a marker, and fluorescence signals of the markers in the particular image areas 25, may be detected. When various fluorescent dyes are used in the various coloring rounds, in addition each analyte 39 should be marked with each of the various fluorescent dyes. Of course, any known, conventional method, for example from the patent applications EP 2 992 115 B1, WO 2020/254519 A1, and WO 2021/255244 A1 cited above, may also be used for generating the annotated data set.

According to a further alternative, during the training, by changing the order of the image signals in the signal series 31 in the various candidate extraction models, the signal series 31 may be trained in such a way that they also recognize signal series 31 in which the order in which the markers in the coloring rounds are used has been changed. Signal series-agnostic models may be trained in this way.

The same as for training the registration model, for training the candidate extraction model a pretrained model may also be selected from a set of pretrained models, and the pretrained model may be adapted to a new experiment by means of transfer learning.

In addition to training of the registration model or the multiple registration models and the candidate extraction model, step S2 also includes training of an assignment model.

According to this embodiment, the assignment model is directly trained to identify a type of analyte. An annotated data set for training the assignment model includes the microscopic images 5 of the image series 19, which have been assigned to a type of analyte by means of the cluster analysis. For each candidate signal series, the assignment model indicates/outputs a probability distribution with the particular probabilities of belonging to the various types of analytes to be identified. A target output of the assignment model includes in each case a "hard" assignment to one of the types of analytes.

As described above with regard to the training of the registration model and of the candidate extraction model, the assignment control module 32 controls the training of the assignment model.

Alternatively, an assignment of the type of analyte may also take place in two steps. For this purpose, the candidate signal series is initially binarized. Matching to the target bit sequences 35 of the codebook 23 subsequently takes place. When the assignment of the type of analyte takes place in two steps, for example a binarization model must be trained instead of the assignment model. The binarization model maps the image signals of the candidate signal series, i.e., the colored signals and the uncolored signals, onto bit values, i.e., true and false. During a training of the binarization model, the recorded signal series 31 are mapped onto bit sequences.

Alternatively, the binarization model may also be designed in such a way that for each image signal in the candidate signal series it outputs a probability of being a colored signal.

The binarization of the candidate signal series may also take place using a heuristic approach. Alternatively, a generative network may carry out the mapping into the binary space.

In addition to the types of analytes to be identified, the set of classes of the types of analytes also includes a class that is representative of image areas 25 or candidate signal series and that is to be assigned to the background. Such an assignment to the background always takes place when, for example, matching to the target bit sequences is very poor, or also when the result of the assignment model results in a very poor value for all types of analytes.

When the various processing models of the analyte data evaluation system 1 are completely trained, the inference may take place in step S3; i.e., new data may be recorded and analyzed using the various processing models of the analyte data evaluation system 1.

Figure 3:
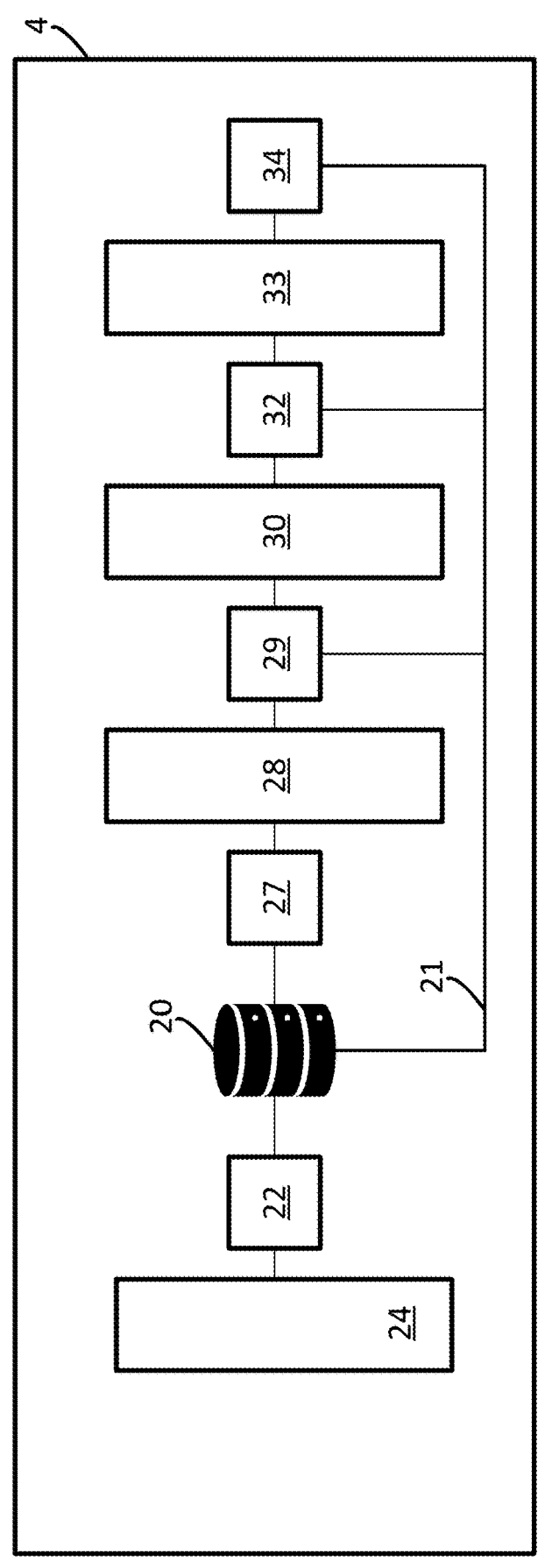
FIG. 3 schematically shows a device for use with the method according to one embodiment.

According to the first embodiment, microscopic images 5 of the image series 19 are first recorded. For this purpose, various markers are coupled to the analytes 39 present in the sample according to a codebook 23, and a microscopic image 5 of the sample is then recorded. According to the first embodiment, in each coupling series, markers having various colors, in the present case three (orange, yellow, and green), are coupled to the analytes 39. After the coupling, three microscopic images 5 are recorded in three coloring rounds, i.e., one coloring round each. Each of the microscopic images 5 is recorded in a different fluorescence contrast by operating the fluorescent illumination device 13 at various excitation wavelengths or using various filters, in the present case, for example, wavelengths for exciting fluorescence in orange, yellow, and green. Accordingly, for analytes 39 to which the orange-colored markers are coupled in the first coloring round, which is recorded in orange, for example, a colored signal is detected, while for analytes 39 to which the yellow or green markers are coupled, an uncolored signal is detected. According to the embodiment, in each case in a first coloring round, after the coupling, a microscopic image 5 is recorded in the orange contrast, and in a second coloring round, after the coupling, a microscopic image 5 is recorded in a green contrast, and in a third coloring round, after the coupling, a microscopic image 5 is recorded in a yellow contrast. The codebook 23 illustrated in FIG. 3 contains, instead of a target bit sequence 35, a code word that encodes in the contrast colors of the coloring rounds. That is, an analyte A is coupled to an orange-colored marker for the first through third couplings, and is coupled to a green marker for the fourth and fifth couplings. Since in each case in the first coloring round, a microscopic image 5 is initially recorded in the orange contrast after the coupling, an O in the code word corresponds to a bit sequence 100, a Y corresponds to a 010 in the bit sequence, and a G corresponds to a 001 in the bit sequence. Corresponding analytes A, B, and C are marked in the coloring rounds R1, R2, R3, and R4 of the microscopic images 5 of the image series 19.

Figure 5:
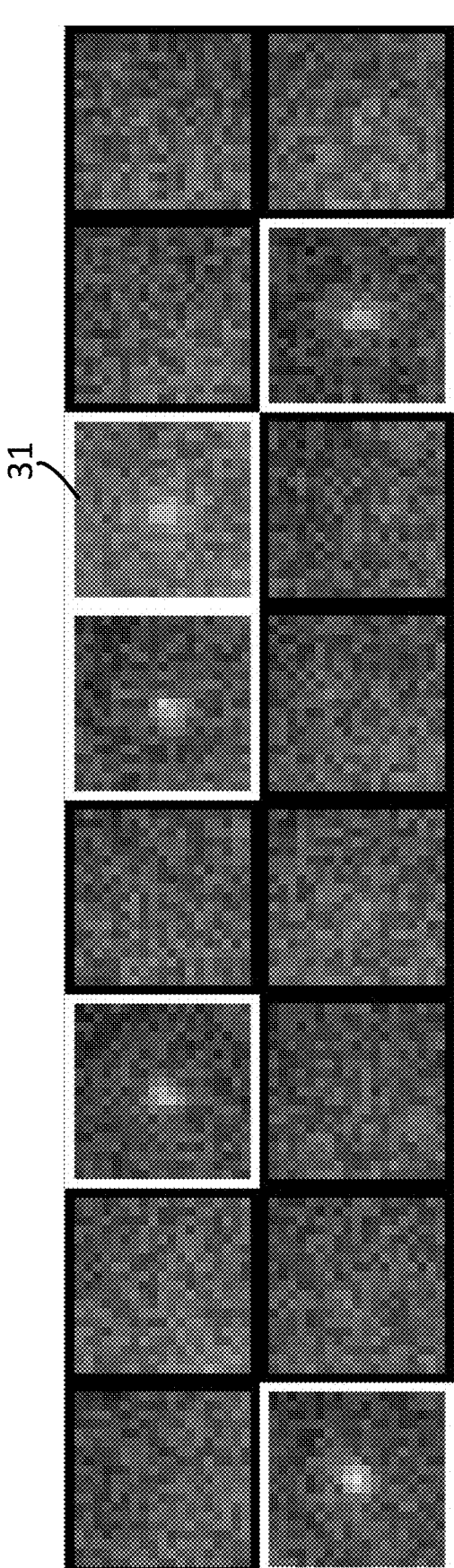
FIG. 5 shows a schematic illustration of measured data, which are analyzed in various of the methods of the various embodiments.
Figure 6:
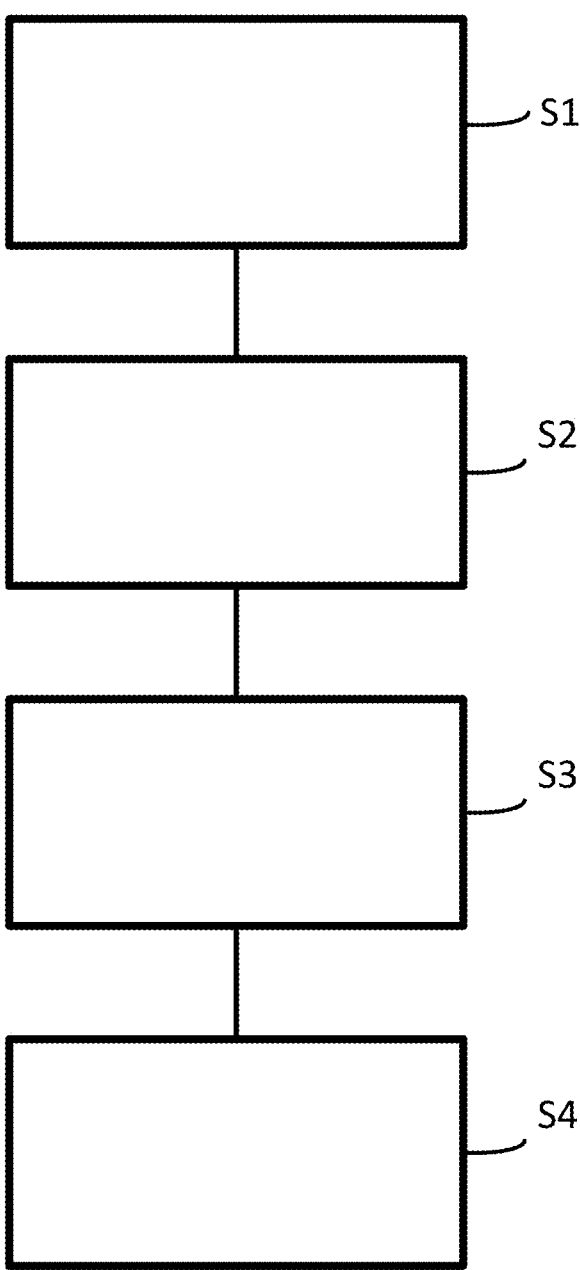
FIG. 6 shows a schematic illustration of processes of a method according to a further embodiment.

According to one alternative, it is also possible to use only one individual color contrast, two color contrasts, or more than three color contrasts when recording the microscopic images 5 of the image series 19. FIG. 5 schematically shows excerpts of microscopic images 5 of an image series 19, wherein excerpts outlined in black contain only pixels with uncolored signals, while in the excerpts outlined in white, in each case pixels with colored signals are centrally illustrated in a schematic manner. The microscopic images 5 in the right column are recorded with a first color contrast, and the microscopic images 5 in the left column are recorded in a second color contrast.

After the image series 19 has been recorded, the image series 19 is stored in the memory module 20. The registration control module 27 reads out the microscopic images 5 of the image series 19, for example individually in succession, and relays the microscopic images 5 of the image series 19 to the registration module 28. The registration module 28 uses the registration model to register the microscopic images 5 of the image series 19 with one another.

The output of the completely trained registration model, i.e., the microscopic images 5 of the image series 19 that are registered with one another, may be relayed by the registration module 28 directly to the candidate extraction control module 29.

The candidate extraction control module 29 inputs the data into the candidate extraction module 30. The candidate extraction module 30 uses the completely trained candidate extraction model according to the embodiment in order to identify the candidate signal series.

After the candidate extraction module 30 has output the candidate signal series, the output candidate signal series may be supplied to postprocessing by the assignment control module 32.

The assignment control module 32 receives the candidate signal series from the candidate extraction module 30 and combines neighboring image areas 25 into image regions when the neighboring image areas 25 have in each case captured candidate signal series. The combining of the neighboring image areas 25 into image regions also includes non-maximum suppression.

After the assignment control module 32 has determined the image regions, the determined image regions are subjected to checking. During checking of the image regions, the assignment control module 32 checks whether the image regions, for example, exceed a maximum size, whether the shape of the determined image regions allows a conclusion that two of the image regions here actually should be separate from one another, for example because only a few bridge pixels are present between two image regions. In addition, the assignment control module 32 may discard image regions if they do not reach a minimum size.

The assignment control module 32 determines image region signal series for the image regions, based on the candidate signal series of the combined image areas 25.

The image region signal series as candidate signal series are subsequently relayed to the assignment control module 32 in order to determine the particular type of analyte, based on the image region signal series.

In the assignment control module 32, the image region relays signal series to the assignment module 33.

The assignment module 33 utilizes one of the assignment models described above to assign a type of analyte to the candidate signal series or to the image region signal series. As described above, as a result of assigning the type of analyte, the candidate signal series may possibly not fit any of the types of analytes of the codebook 23, and is therefore assigned to the background.

The above-described steps for determining an image region may also be carried out after assigning the type of analyte. For example, for each of the types of analytes to be identified, the codebook 23 contains analyte context information that indicates, for example, a maximum size for an image region as a function of the type of analyte, which may indicate, for example, where in a sample, for example in which of the above-described components of a cell, the particular types of analytes may arise, or which of the types of analytes in the sample may be colocated at which sites. Determining the image region may accordingly take this analyte context information into account, and may optionally combine or separate analyte regions, determine new image region signal series corresponding to the combination or separation, and initiate a new assignment of the type of analyte for newly determined image region signal series.

According to a step S4, it is checked whether the assignment by means of the assignment module 33 results in more than one threshold value of candidate signal series not corresponding to one of the types of analytes to be identified. If the threshold value is exceeded, the corresponding candidate signal series in the annotated data set for training the candidate extraction model are recorded, and the training of the candidate extraction model is repeated, using the expanded annotated data set.

Alternatively, the assignment of the candidate signal series to the types of analytes may also take place by means of the cluster analysis module 24. This is meaningful, for example, when an annotated data set for the training of the assignment model contains only very little training data. In addition, of course step S4 may also be carried out, based on the results of the cluster analysis, after the cluster analysis is performed. If step S4 takes place based on the results of the cluster analysis, the cluster analysis control module 22 provides the expanded annotated data set.

Analogously, for example the results of an assignment of the assignment module 33 for sets of registration information that are determined by various of the registration models may also be compared in step S4. If this comparison shows that one of the sets of registration information achieves much better results for the assignment, a new data set of annotated data for training the registration models may be created from the set of registration information that achieves the better results, and the registration model may be retrained according to the method described above.

According to the method for operating the analyte data evaluation system 1 as described here, the various processing models may be continuously further trained.

According to a second embodiment, the analyte data evaluation system 1 includes only the memory module 20, the registration control module 27, and the registration module 28. The analyte data evaluation system 1 is then a system for registering microscopic images 5 of an image series 19 that has been recorded according to one of the methods described above.

According to a third embodiment, the analyte data evaluation system 1 includes only the memory module 20, the candidate extraction control module 29, and the candidate extraction module 30. The analyte data evaluation system 1 is then a system for preparing image data of an image series 19 in order to provide the prepared image data, i.e., the candidate signal series of the image series 19, for further analysis. For example, the analyte data evaluation system 1 in the third embodiment may store the extracted candidate signal series and delete the remaining non-candidate signal series in order to free up memory space.

According to a fourth embodiment, the analyte data evaluation system 1 includes only the memory module 20, the assignment control module 32, and the assignment module 33. In the fourth embodiment, the analyte data evaluation system 1 is a system for identifying types of analytes for candidate signal series.

LIST OF REFERENCE NUMERALS 1 analyte data evaluation system
2 microscope
3 control device
4 evaluation unit
5 microscopic image
6 stand
7 objective revolver
8 mounted objective
9 sample stage
10 mounting frame
11 sample carrier
12 microscope camera
13 fluorescent illumination device
14 transmitted light illumination device 15 overview camera
16 visual field
17 mirror
18 screen
19 image series
20 memory module
21 channel
22 cluster analysis control module
23 codebook
24 cluster analysis module
25 image area
26 background image area
27 registration control module
28 registration module
29 candidate extraction control module
30 candidate extraction module
31 signal series
32 assignment control module
33 assignment module
34 output module
35 target bit sequences
36 segmentation mask
37 fully convolutional network
38 fully connected network
39 analyte

The invention claimed is:

1. A method for identifying analytes in an image series, the image series being generated by marking analytes with markers in multiple coloring rounds and detecting the markers using a camera, the camera recording an image of the image series in each coloring round, the markers being selected in such a way that image signals of an analyte in an image area over the image series include colored signals and uncolored signals, comprising:

extracting multiple signal series of an image area of the image series in each case, filtering out candidate signal series from the extracted signal series, wherein a signal series is assessed as a candidate signal series when:

(i) a ratio of at least one signal of the signal series selected from the group consisting of a colored signal and an uncolored signal to at least one other signal of the signal series selected from the group consisting of a colored signal and an uncolored signal is a characteristic ratio; or (ii) the signal series has a characteristic signature that comprises at least one characteristic ratio; or (iii) a ratio of at least one signal of the signal series selected from the group consisting of a colored signal and an uncolored signal to at least one other signal of the signal series selected from the group consisting of a colored signal and an uncolored signal is a characteristic ratio and the signal series has a characteristic signature that comprises the at least one characteristic ratio, and assigning the candidate signal series to a type of analyte or to the background.

2. The method according to claim 1, wherein the filtering out of candidate signal series is carried out by using a candidate extraction model, the candidate extraction model being selected from a set of candidate extraction models based, for example, on a type of sample, a type of experiment, or a user ID.

3. The method according to claim 2, wherein the candidate extraction model has been trained to use at least one specified ratio, the at least one specified ratio being a ratio of one of the colored or uncolored signals of the particular signal series to at least one other of the colored or uncolored signals of the particular signal series, and wherein the candidate extraction model has been trained (i) to identify the colored and uncolored signals based on the at least one specified ratio, or (ii) to identify the candidate signal series based on a characteristic signature that has the at least one specified ratio.

4. The method according to claim 2, wherein the candidate extraction model is a semantic segmentation model that assigns to each image area a value that indicates whether the image area captures an analyte, the value indicating, for example, a probability or a point value that the image area is an analyte image area, or the value being a bit that indicates whether or not the image area is an analyte image area.

5. The method according to preceding claim 4, wherein the candidate extraction model is a patch classifier, and assigns the value to each image area by use of a sliding window method.

6. The method according to claim 2, wherein the candidate extraction model is a fully convolutional network, and as a classification model has been trained with fully connected layers using signal series of individual image areas, and after the training, the classification model is converted into the fully convolutional network by replacing the fully connected layers with convolutional layers, the signal series of all image areas of the image series being simultaneously processed in the fully convolutional network.

7. The method according to claim 2, wherein the candidate extraction model is an image-to-image model and carries out image-to-image mapping that assigns to each image area a distance value that indicates the distance of the image area from a closest image area that includes a candidate signal series, or that assigns to each pixel a probability of being an image area that includes a candidate signal series.

8. The method according to claim 2, wherein the candidate extraction model is implemented as a detection model, and outputs a list of the candidate areas that include a candidate signal series.

9. The method according to claim 1, wherein the method also comprises, prior to the checking for whether the signal series is a candidate signal series, a step of transforming the signal series by means of principal axis transformation or singular value decomposition, and the transformed signal series is used in checking whether the signal series is a candidate signal series, for example only one subset of the components of the transformed signal series being used in the cluster analysis, and for example the first component, or the first component and the last component, or the first and the last two components preferably being omitted.

10. The method according to claim 1, wherein the image areas each include only one pixel, an area of contiguous pixels, or a contiguous volume in an image stack, and are input into the candidate extraction model as a tensor, for example.

11. The method according to claim 1, also comprising determining an image region, the determining of an image region including:

combining neighboring image areas into an image region when the neighboring image areas have candidate signal series, the combining of neighboring image areas including non-maximum suppression, for example.

12. The method according to preceding claim 11, wherein the determining of an image region also includes: checking the image regions, the checking of an image region including at least one of the following:

separating the image region into two or more image regions when the image region exceeds a maximum size, including determining an image region signal series for each of the image regions that arises from the separation, separating the image regions into two or more image regions when the image regions in each case are connected to one another by only a few bridge pixels, or, based on a shape of the image region, it is apparent that two image regions intersect here, including determining an image region signal series for each of the image regions that arises from the separation;

separating the image region based on analyte context information, analyte context information including, for example: information concerning a size of an image region as a function of the type of analyte, information concerning a location of an image region in a sample, information concerning colocations of certain types of analytes in certain regions or in a location in a sample, or expected analyte densities as a function of a location in a sample or a location of an image area;

discarding image regions when an image region falls below a minimum size or has a shape that cannot be assigned to an analyte with certainty.

13. The method according to claim 11, wherein the determining of an image region also includes determining an image region signal series based on corresponding candidate signal series of the image region, and the assigning of the candidate signal series to a type of analyte or to the background takes place based on the image region signal series.

14. The method according to claim 11, wherein the determining of an image region is carried out after checking whether the signal series is a candidate signal series, and before assigning the candidate signal series to a type of analyte or to the background and/or after assigning the candidate signal series to a type of analyte or to the background.

15. The method according to claim 11, further comprising:

using the identified type of analyte as analyte context information when determining the image region, the following in particular being included, based on the analyte context information:

information concerning a size of an image region as a function of the type of analyte, information concerning a location of a type of analyte in a sample, or information concerning colocation of certain types of analytes.

16. The method according to claim 1, wherein the identifying of a type of analyte based on the signal series includes:

determining a result bit sequence from the signal series, a true value being assigned to the colored signals and a false value being assigned to the uncolored signals in order to obtain the result bit sequence, identifying the type of analyte based on the result bit sequence, the result bit sequence being compared to target bit sequences of a codebook which includes at least one target bit sequence for each of the types of analytes to be identified.

17. The method according to claim 16, wherein the determining of a result bit sequence is carried out by use of a binarization model.

18. The method according to preceding claim 17, wherein the binarization model is a classification model, the classification model having been trained to output an output bit sequence as the result output, either a "hard" assignment to the result output taking place by the processing model assigning a true value in the result bit sequence to the colored signals of the input signal series and assigning a false value in the result bit sequence to the uncolored signals, or a "soft" assignment taking place by the processing model outputting a probability distribution in which a probability is assigned to each image signal of the signal series, which indicates the probability that the image signal of the signal series is a colored signal.

19. The method according to claim 1, wherein the identifying of a type of analyte based on the signal series includes:

inputting the candidate signal series into an assignment model, outputting a type of analyte of the candidate signal series, the outputting of a type of analyte either taking place "hard," in which exactly one type of analyte is assigned to each candidate signal series, or taking place "soft," in which a probability distribution with assignments to the various types of analytes is output for each candidate signal series.

20. The method according to claim 1, further comprising adapting a sensitivity, by means of the sensitivity it being possible to adapt the number of identified analytes to an expected number of analytes to be identified.

21. The method according to claim 20, wherein the adapting of the sensitivity includes in particular:

adapting a model sensitivity of the candidate extraction model, via which the number of candidate signal series identified in the extracted signal series may be set, or adapting an identification sensitivity, via which during the identification of the type of analyte, a threshold value is set, above which a candidate signal series as background is discarded.

22. The method according to claim 1, wherein assigning the candidate signal series to a type of analyte or to the background takes place according to a method for identifying analytes in an image series by means of a cluster analysis, the image series being generated by marking the analytes with markers in multiple coloring rounds and detecting the markers using a camera, the camera recording an image of the image series in each coloring round, the markers being selected in such a way that image signals of an analyte in an image area over the image series include colored signals and uncolored signals, comprising:

extracting multiple signal series of an image area of the image series in each case, clustering the extracted signal series by means of a cluster analysis algorithm, the number of predefined clusters being at least equal to the number of types of analytes to be identified, and one of the clusters being assigned to each of the signal series, determining a cluster center for each of the clusters, determining at least one target cluster center for each of the types of analytes to be identified, based on target series of a codebook, the codebook including a target series for each type of analyte to be identified, determining, for each of the cluster centers, distances of the cluster center from the target cluster centers, and assigning, based on the distances, the clusters to one of the types of analytes or to a background, and assigning the signal series to the type of analyte or to the background, based on the assignment of the determined cluster, wherein only the identified candidate signal series are extracted.

23. The method according to claim 1, further comprising:

generating an expanded annotated data set, based on the extracted signal series and the assignment of the signal series to the type of analyte or to the background, and carrying out the method for training a machine learning system according to one claim 7, using at least the expanded annotated data set as the annotated data set.

24. The method according to claim 1, wherein image signals of the signal series are situated in an experiment feature space and target image signals of the target bit sequences are situated in a reference feature space, and the method also comprises, prior to comparing the signal series to the target bit sequences of the codebook:

converting the image signals of the signal series from the experiment feature space into the reference feature space.

25. The method according to claim 1, wherein the method also comprises, prior to checking whether the signal series is a candidate signal series, a step of carrying out a background correction of the image signals of the image series, the carrying out of the background correction including one or more of the following:

a rolling ball method, filtering, for example a top hat method, homomorphous filtering, low pass filtering, wherein the result of the low pass filtering is subtracted from the signal, or temporal filtering, background correction by use of an image-to-image model, background correction by use of mixed models, background correction by use of a mean shift method, background correction by use of principal component analysis, background correction by use of non-negative matrix factorization, or background correction by the excitation of autofluorescence by use of a nonspecific laser for all image areas of the image series.

26. The method according to claim 1, further comprising determining registration information of images of an image series.

27. The method according to preceding claim 26, wherein at least two sets of various registration information are determined according to at least two different methods, which are carried out using each of the various sets of registration information, and after the analytes are identified, a best result for the identification of analytes is selected from the at least two results, an assessment of the results taking place, for example, based on an expected distribution of the analytes.

28. The method according to preceding claim 27, wherein the at least two sets of various registration information are determined by employing a method for determining registration information of images of an image series by use of a registration model, the registration information including at least translation information and rotation information, the registration model being trained to recognize registration structures in images, and the registration structures being structures that occur in images, and to which a location may be unambiguously assigned, comprising:

inputting the image series into the registration model, determining the registration information.

* * * * *